US011861678B1

(12) United States Patent
Grigsby et al.

(10) Patent No.: US 11,861,678 B1
(45) Date of Patent: *Jan. 2, 2024

(54) UPDATING CART STATE USING AUTO-GENERATED SENSOR DATA

(71) Applicant: Amazon Technologies, Inc., Seattle, WA (US)

(72) Inventors: Travis Michael Grigsby, Seattle, WA (US); Kevin Alexander Lee, Seattle, WA (US); Pranoti Pimpalkhute, Seattle, WA (US); Harshal Pandya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/193,582

(22) Filed: Mar. 5, 2021

Related U.S. Application Data

(63) Continuation of application No. 15/393,095, filed on Dec. 28, 2016, now Pat. No. 10,943,285.

(51) Int. Cl.
G06Q 30/00 (2023.01)
G06Q 30/0601 (2023.01)
H04L 67/146 (2022.01)
G06Q 10/087 (2023.01)
H04L 67/1097 (2022.01)

(52) U.S. Cl.
CPC ....... G06Q 30/0633 (2013.01); G06Q 10/087 (2013.01); H04L 67/146 (2013.01); H04L 67/1097 (2013.01)

(58) Field of Classification Search
CPC ........... G06Q 30/0633; G06Q 10/087; H04L 67/146; H04L 67/1097
See application file for complete search history.

(56) References Cited

U.S. PATENT DOCUMENTS

| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 9,911,290 | B1 | 3/2018 | Zalewski et al. |

(Continued)

OTHER PUBLICATIONS

"Amazon and end of grocery line", The Korea Times [Seoul], Dialog# 1349558297, Dec. 2016, 3 pgs.
Office Action for U.S. Appl. No. 15/393,042, dated Apr. 21, 2020, Grigsby, "Updating Cart State Using Auto-Generated Sensor Data ", 43 Pages.

(Continued)

*Primary Examiner* — Robert M Pond
(74) *Attorney, Agent, or Firm* — Lee & Hayes, P.C.

(57) ABSTRACT

This disclosure describes techniques for utilizing sensor data to automatically determine the results of events within a system. Upon receiving sensor data indicative of an event, the techniques may analyze the sensor data to determine a result of the event, such as that a particular user associated with a user identifier selected a particular item associated with an item identifier. Contents of a virtual shopping cart of the user may be maintained based on this automated analysis of sensor data. In some instances, when a confidence level associated with a result is less than a threshold, the sensor data may be sent to a client computing device for analysis by a human user. Further, when the result of an event changes from a first result to a second result, other events already processed may be reprocessed to ensure accuracy of the results.

20 Claims, 28 Drawing Sheets

(56) References Cited

U.S. PATENT DOCUMENTS

| | | | |
|---|---|---|---|
| 10,127,438 | B1 | 11/2018 | Fisher et al. |
| 10,133,933 | B1 | 11/2018 | Fisher et al. |
| 10,354,262 | B1 | 7/2019 | Hershey et al. |
| 10,438,164 | B1 | 10/2019 | Xiong et al. |
| 10,943,285 | B1 * | 3/2021 | Grigsby ................ H04L 67/146 |
| 2003/0222762 | A1 | 12/2003 | Beigl et al. |
| 2007/0219947 | A1 | 9/2007 | Harinath |
| 2013/0284806 | A1 | 10/2013 | Margalit |
| 2014/0114976 | A1 | 4/2014 | Shiraishi |
| 2014/0379296 | A1 | 12/2014 | Nathan et al. |
| 2015/0029339 | A1 | 1/2015 | Kobres et al. |
| 2016/0019514 | A1 | 1/2016 | Landers, Jr. et al. |
| 2016/0259329 | A1 | 9/2016 | High et al. |
| 2017/0055112 | A1 | 2/2017 | Westphal et al. |
| 2017/0178060 | A1 | 6/2017 | Schwartz |
| 2017/0308942 | A1 | 10/2017 | Landers, Jr. et al. |
| 2017/0333777 | A1 * | 11/2017 | Spivak ................... G06T 7/246 |
| 2018/0174122 | A1 | 6/2018 | Mattingly et al. |

OTHER PUBLICATIONS

Non Final Office Action dated Oct. 18, 2019 for U.S. Appl. No. 15/393,042 "Updating Cart State Using Auto-Generated Sensor Data" Grigsby, 29 pages.

Office Action for U.S. Appl. No. 15/393,095, dated Dec. 6, 2019, Grigsby, "Updating Cart State Using Auto-Generated Sensor Data", 22 Pages.

Office Action for U.S. Appl. No. 15/393,095, dated May 28, 2019, Grigsby, "Updating Cart State Using Auto-Generated Sensor Data", 28 pages.

Patents; Agency Reviews Patent Application Approval Request for "Interactive Consumer Self-Service Shopping System", Politics and Government Week [Atlanta], Dialog # 1349558297, May 2013, 3 pgs.

Saran, et al., "Robust Visual Analysis for Planogram Compliance Problem", 14th IAPR International Conference on Machine Vision Applications ( MVA), IEEE, 2015, pp. 579-579.

* cited by examiner

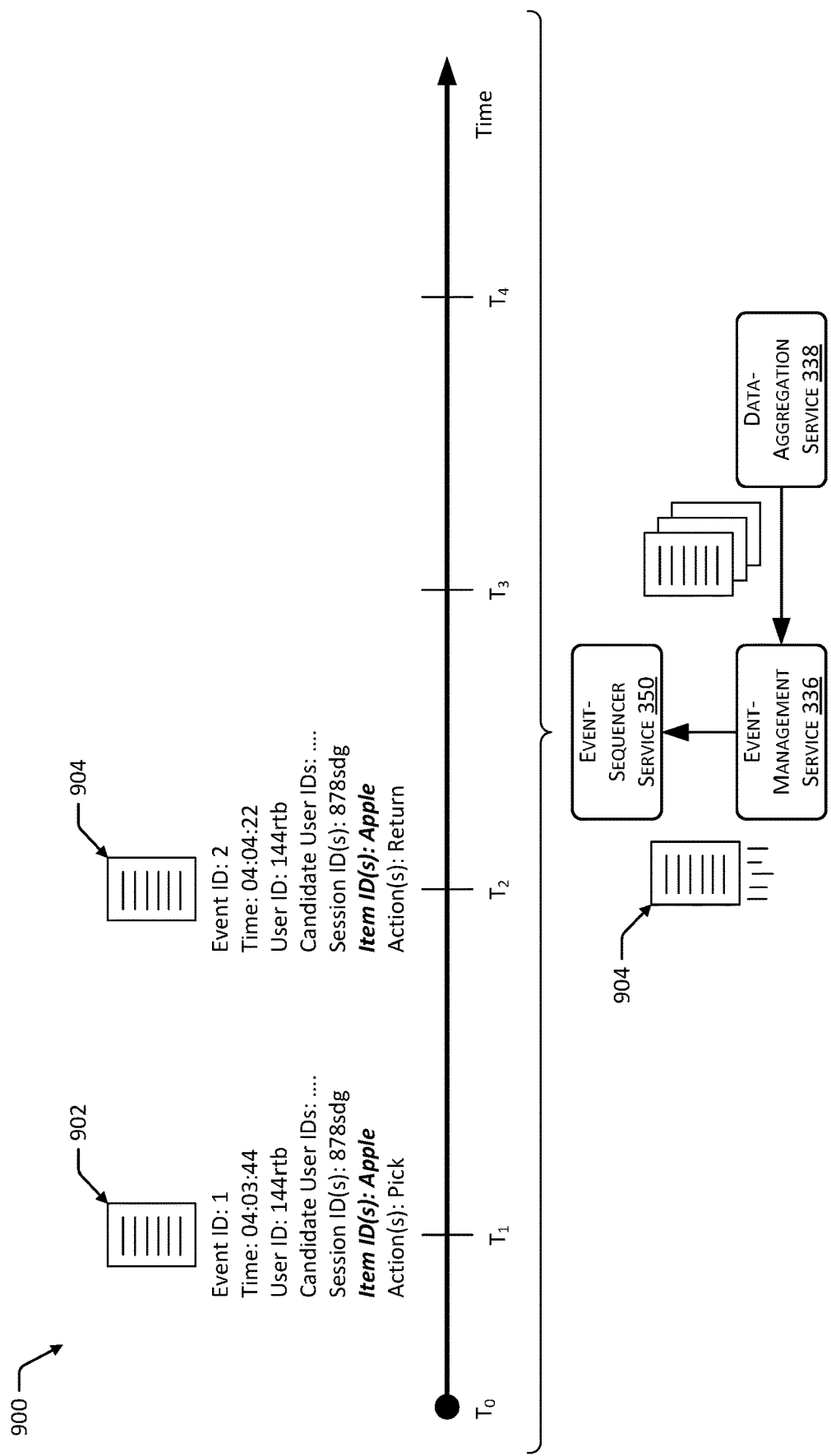

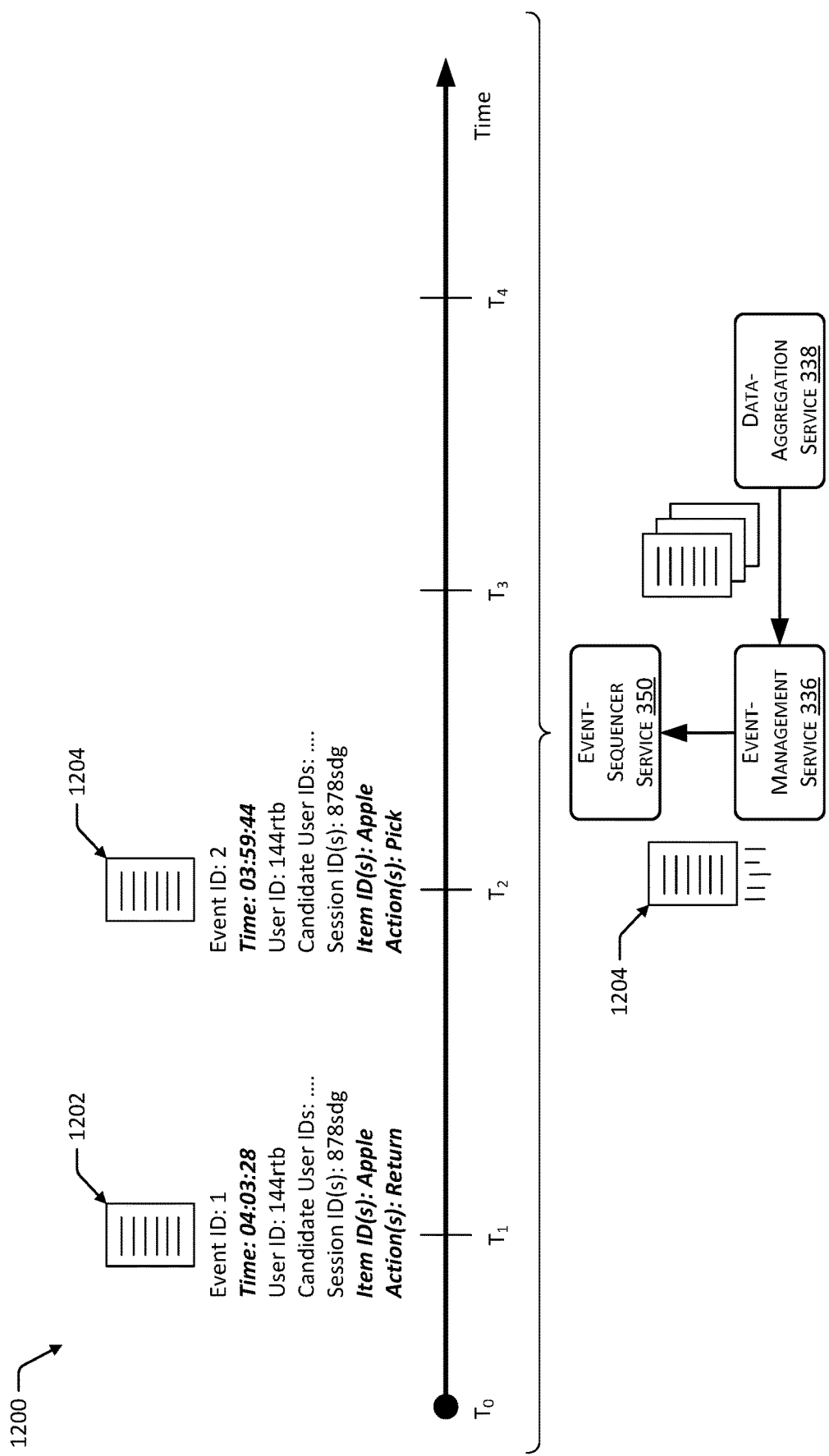

UPDATING CART STATE USING AUTO-GENERATED SENSOR DATA

RELATED APPLICATIONS

This application claims priority to and is a continuation of U.S. patent application Ser. No. 15/393,095, filed on Dec. 28, 2016, the entire contents of which are incorporated herein by reference.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 9a-9d collectively illustrate a schematic diagram of reprocessing a second event based on the result of an earlier, first event changing. In this example, the item associated with the first event changes while the user associated with the event remains the same. Thus, events associated with that user that have respective times later than the first event (e.g., the illustrated second event) are to be reprocessed.

FIGS. 12a-12d collectively illustrate another schematic diagram of reprocessing an event based on the processing of events occurring out-of-order. In this illustrated example, a first event that occurred earlier in time than a second event is processed after the second, later event. Thus, because the second event was processed without the result of the first event, the second event is to be reprocessed with the benefit of the result of the first event. Further, in this example the second event is entirely processed prior to the beginning of processing of the first event. Thus, the first event is also to be reprocessed, given that the initial processing of the first event took into account the result of the second event, which in actuality occurred later in time than did the first event.

DETAILED DESCRIPTION

Figure 1:
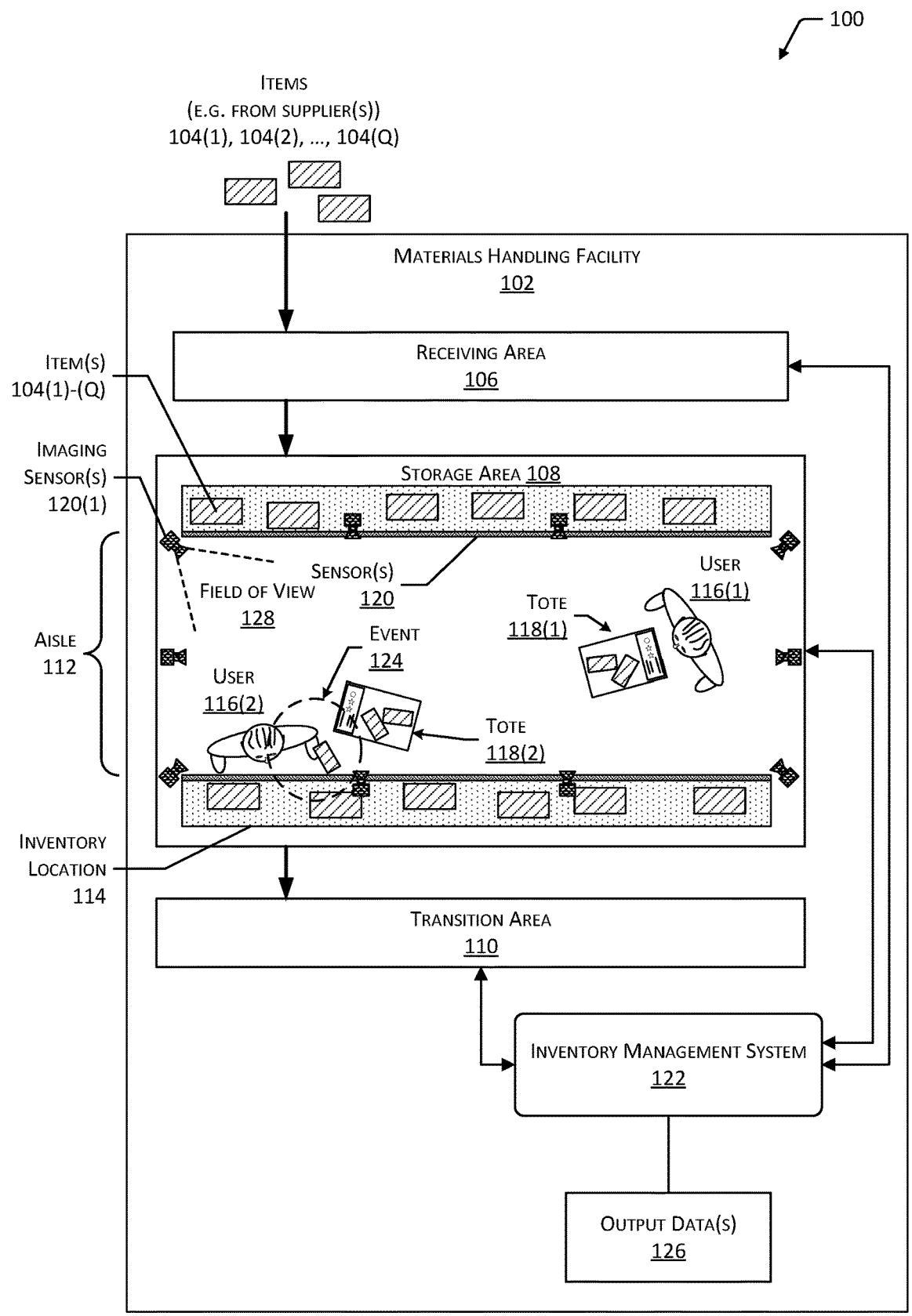
FIG. 1 is a block diagram of a materials handling facility that includes sensors and an inventory management system configured to generate output regarding events occurring in the facility using the sensor data. The events may include, for example, a user picking an item or returning an item. In some instances, the inventor management system maintains a state of virtual shopping cart of each user in the facility using the sensor data.

This disclosure describes systems and techniques for detecting events occurring within a materials handling facility (facility) and updating virtual shopping carts of respective users based on the detected events. The facility may include, or have access to, an inventory management system. The inventory management system may be configured to maintain information about items, users, condition of the facility, and so forth. For example, the inventory management system may maintain data indicative of a result of different events that occur within the facility, such as what items a particular user is ordered to pick, location of the particular user, availability of a user providing support services to others, requests for assistance, environmental status of the facility, and so forth. As such, as used herein a "result" of an event may comprise data representing some inference regarding the event, which may represent a particular value, indication that the event is inconclusive, or the like. That is, the result of an event may comprise any information deduced from automated or manual analysis of sensor data at least partly representative of the event. Further, it is to be appreciated that analysis of first data associated with an event may produce a first result. However, analysis of second data associated with the same event may produce a second result. Further, because these results are essentially calculated hypotheses of what the actual real-world result of the event was, the produced results may differ from one another and, potentially, from the real-world result of the real-world event.

Operation of the inventory management system may be supported by sensor data acquired by one or more sensors. The sensor data may include image data acquired by imaging devices such as cameras, information acquired from radio frequency tags, weight sensors, and so forth.

The inventory management system may determine, using the sensor data, occurrence of one or more events within the facility. Events may involve interactions between one or more items, inventory locations, users, totes, robots, changes in sensor operation, movement of objects, and so forth. For example, a user may remove an item from an inventory location. In another example, two or more users may move past one another or attempt to access the same inventory location contemporaneously. When the system described herein detects sensor data indicative of an event, the system may generate an event record that indicates the occurrence of the event.

The inventory management system may be configured to generate output data providing information indicative of the event using one or more machine learning or automated systems to process the sensor data. For example, artificial neural networks, classifiers, and so forth, may be used to process the image data of an event and identify the item that was removed from the inventory location, identify the users after they move apart, disambiguate if the user picked or placed an item from an inventory location, and so forth.

The inventory management system may be automated to provide the output data during operation. For example, the inventory management system may automatically identify an item removed from an inventory location as well as a user that removed the item. In response, the inventory management system may automatically update a virtual shopping cart of that particular user. However, in some situations, it may be advantageous to use human input to generate or confirm the output data. In these situations, inquiry data may be provided to an associate service that provides the inquiry data to one or more devices associated with one or more associates supporting operation of the facility.

The inquiry data may comprise at least a portion of the sensor data associated with the event. For example, the sensor data may comprise image data such as a video clip or still image showing the user interacting with an item. An associate user interface presents at least a portion of the image data and generates response data indicative of the input from the associates. In some implementations, the inquiry data may also comprise tentative results of the events. For example, the tentative results may comprise the possible results associated with the event as generated by the inventory management system. Continuing the example, tentative results may comprise a list of the possible items the user may be interacting with. The response data may comprise data indicative of a selection by the associate of one or more of the tentative results. The response data may then be used to update the virtual shopping cart of a user, similar to how a virtual shopping cart may be updated after automatically determining this information.

As noted above, the system may use sensor data to determine occurrence of an event, such as a user picking an item form a shelf in the facility. The system may use this sensor data to associate a result to an event record associated with this event, such as indication of an item identifier of the item picked, a number of the total items picked, a user that picked the item, etc. Further, the system may calculate a confidence level associated with the determined result. If this confidence level is higher than a threshold confidence level, the system may store a result of the event. If, however, the confidence level is lower than the threshold confidence level, then the system may request input from an associate. In either instance, a final result may be determined and a virtual shopping cart may be correspondingly updated. For instance, if the inventory management determines with a threshold level of confidence that a particular user picked a particular box of cereal from a shelf of the facility, or if a human associate manually makes that determination, the inventory management system may update the virtual shopping cart of that user to indicate this particular box of cereal. Therefore, when the user requests to finalize a transaction with a provider of the system (e.g., request to pay for items in the user's shopping cart), the inventory management system may charge a payment instrument of the user for a cost of all items designated in the virtual shopping cart, including the box of cereal.

In some instances, the inventory management system may determine a first result of an event and, thereafter, modify that result (e.g., generate a new result fort that event). For instance, as mentioned above, the sensor data may be analyzed to automatically determine information about an event, such as that a particular user grabbed a particular box of cereal (e.g., "Acme Cereal"). If, however, the confidence level associated with this result is less than the threshold confidence level, then the sensor data may be sent to a client computing device for analysis by a human user. The human user may then analyze the sensor data (e.g., by watching video acquired by one or more cameras within the environment) to determine a different result of the event, such as the same or a different user selecting a different type of cereal than initially determined (e.g., "Oatmeal Cereal").

While this re-analysis occurs, however, other events may be occurring within the facility. That is, users may be picking other items from the shelves, returning these items, and the like. Furthermore, the results of previous events may be used to determine the results of these occurring events. For instance, if the system receives video data that appears to show the user mentioned above returning a box of cereal to the shelf, the system may hypothesize the item returned to the shelf based on the video data as well as the state of the virtual shopping cart of the user. In the instant example where the system automatically determined that the user picked the box of "Acme Cereal", during the subsequent return of an item to the shelf the system may determine that the event comprises the user returning the box of "Acme Cereal".

However, in this example, the human user determined that the user actually picked the box of "Oatmeal Cereal". Therefore, after the result of the first event is corrected by removing, from the virtual shopping cart of the user, the box of "Acme Cereal" and adding the box of "Oatmeal Cereal", the virtual shopping cart of the user will show one (1) box of "Oatmeal Cereal" and minus one (−1) box of "Acme Cereal", when in fact the user has no cereal at all. That is, because the second event (the return of the item) was processed without the second result of the first event (the picking of the item from the shelf), the net state of the user's virtual shopping cart is incorrect.

Therefore, techniques are described herein to reprocess events when the result of a first event changes. That is, when the result of one event changes, the system may identify subsequent events that occurred after this event, have been processed, and are related to this first event. The system may then reprocess these events in a serial fashion (i.e., chronologically) to increase the accuracy of each event.

In the above example, for instance, after the human user indicates that the user actually picked the box of "Oatmeal Cereal", the system may identify other events that have been processed and that relate to the subject user. In this example, this will result in identification of the second, return event. After the virtual shopping cart of the user has been updated to include a box of "Oatmeal Cereal" rather than "Acme Cereal" after the first event, the second event will be reprocessed. In this example, the system may then determine that the second event is the return of the box of "Oatmeal Cereal" (based in part on that residing in the user's virtual shopping cart). The user's virtual shopping cart may now show no cereal, which now accurately mirrors the real-world state of the user's physical shopping cart.

While the above example describes an item associated with an event changing, in other instances other portions of a result of an event may change. For instance, a user associated with an event may change from a first user to a second user. In these instances, the system may reprocess chains of events for both the first user and the second user beginning at a time of the seed event (i.e., the event that changed). Further, the result of an event may change in any other way, resulting in the reprocessing of one or more events. For instance, the identified items may change, the quantity of items may change, the action(s) taken with respect to the items may change, the users associated with a common session may change, and/or the like.

In each instance, when the system reprocessed event chains for a particular user, it may also reprocess events for users that are associated with a session that of the particular user. As described in more detail below, a session may comprise a group of users that are shopping together, entered the facility together, or are otherwise associated with one another. For example, each user of a family that enters the facility together may be associated with a unique user identifier while being associated with a common session identifier. When an event of one user of the family changes, events for each user identifier (i.e., each family member) may be reprocessed given that items may often change hands between members of a family (or other type of session).

It is to be appreciated that when a particular event is to be reprocessed, an event record associated with the event may be modified or the event record may be deleted and a new event record may be created. That is, reprocessing an event may comprise updating a result field of an event record or may comprise canceling that event record and generating a new event record (potentially, but not necessarily, with new information in the result field(s)) for the event.

The facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) (generally denoted as 104) may be held. As used in this disclosure, letters in parenthesis such as "(Q)" indicate an integer result. The items 104 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 106, a storage area 108, and a transition area 110. The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) (generally denoted as 116), totes 118(1), 118(2), . . . , 118(T) (generally denoted as 118) or other material handling apparatus may move within the facility 102. For example, the users 116 may move about within the facility 102 to pick or place the items 104 in various inventory locations 114, placing them on the totes 118 for ease of transport. An individual tote 118 is configured to carry or otherwise transport one or more items 104. For example, a tote 118 may include a basket, a cart, a bag, and so forth. The tote 118 is discussed in more detail below with regard to FIG. 4. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, cameras 120(1), weight sensors, radio frequency (RF) receivers, temperature sensors, humidity sensors, vibration sensors, and so forth. The sensors 120 may be stationary or mobile, relative to the facility 102. For example, the inventory locations 114 may contain cameras 120(1) configured to acquire images of pick or placement of items 104 on shelves, of the users 116(1) and 116(2) in the facility 102, and so forth. In another example, the floor of the facility 102 may include weight sensors configured to determine a weight of the users 116 or other object thereupon. The sensors 120 are discussed in more detail below with regard to FIG. 2.

During operation of the facility 102, the sensors 120 may be configured to provide information suitable for tracking how objects move or other occurrences within the facility 102. For example, a series of images acquired by an camera 120(1) may indicate removal of an item 104 from a particular inventory location 114 by one of the users 116 and placement of the item 104 on or at least partially within one of the tote 118s.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, multiple different receiving areas 106, storage areas 108, and transition areas 110 may be interspersed rather than segregated in the facility 102.

The facility 102 may include, or be coupled to, an inventory management system 122. The inventory management system 122 is configured to identify interactions with and between users 116, devices such as sensors 120, robots, material handling equipment, computing devices, and so forth, in one or more of the receiving area 106, the storage area 108, or the transition area 110. These interactions may include one or more events 124. For example, events 124 may include the entry of the user 116 to the facility 102, stocking of items 104 at an inventory location 114, picking of an item 104 from an inventory location 114, returning of an item 104 to an inventory location 114, placement of an item 104 within a tote 118, movement of users 116 relative to one another, gestures by the users 116, and so forth. Other events 124 involving users 116 may include the user 116 providing authentication information in the facility 102, using a computing device at the facility 102 to authenticate identity to the inventory management system 122, and so forth. Some events 124 may involve one or more other objects within the facility 102. For example, the event 124 may comprise movement within the facility 102 of an inventory location 114, such as a counter mounted on wheels. Events 124 may involve one or more of the sensors 120. For example, a change in operation of a sensor 120, such as a sensor failure, change in alignment, and so forth, may be designated as an event 124. Continuing the example, movement of an camera 120(1) resulting in a change in the orientation of the field of view 128 (such as resulting from someone or something bumping the camera 120(1)) may be designated as an event 124.

By determining the occurrence of one or more of the events 124, the inventory management system 122 may generate output data 126. The output data 126 comprises information about the event 124. For example, where the event 124 comprises an item 104 being removed from an inventory location 114, the output data 126 may comprise an item identifier indicative of the particular item 104 that was removed from the inventory location 114 and a user identifier of a user that removed the item.

The inventory management system 122 may use one or more automated systems to generate the output data 126. For example, an artificial neural network, one or more classifiers, or other automated machine learning techniques may be used to process the sensor data from the one or more sensors 120 to generate output data 126. The automated systems may operate using probabilistic or non-probabilistic techniques. For example, the automated systems may use a Bayesian network. In another example, the automated systems may use support vector machines to generate the output data 126 or the tentative results. The automated systems may generate confidence level data that provides information indicative of the accuracy or confidence that the output data 126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 104, user 116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 116 may pick an item 104(1) such as a perfume bottle that is generally cubical in shape from the inventory location 114. Other items 104 at nearby inventory locations 114 may be predominately spherical. Based on the difference in shape (cube vs. sphere) from the adjacent items, and the correspondence in shape with the previously stored image of the perfume bottle item 104(1) (cubical and cubical), the confidence level that the user 114 has picked up the perfume bottle item 104(1) is high.

In some situations, the automated techniques may be unable to generate output data 126 with a confidence level above a threshold result. For example, the automated techniques may be unable to distinguish which user 116 in a crowd of users 116 has picked up the item 104 from the inventory location 114. In other situations, it may be desirable to provide human confirmation of the event 124 or of the accuracy of the output data 126. For example, some items 104 may be deemed age restricted such that they are to be handled only by users 116 above a minimum age threshold.

In instances where human confirmation is desired, sensor data associated with an event 124 may be processed to generate inquiry data. The inquiry data may include a subset of the sensor data associated with the event 124. The inquiry data may also include one or more of one or more tentative results as determined by the automated techniques, or supplemental data. The subset of the sensor data may be determined using information about the one or more sensors 120. For example, camera data such as the location of the camera 120(1) within the facility 102, the orientation of the camera 120(1), and a field of view 128 of the camera 120(1) may be used to determine if a particular location within the facility 102 is within the field of view 128. The subset of the sensor data may include images that may show the inventory location 114 or that the item 104 was stowed. The subset of the sensor data may also omit images from other cameras 120(1) that did not have inventory location 114 in the field of view 128. The field of view 128 may comprise a portion of the scene in the facility 102 that the sensor 120 is able to generate sensor data about.

Continuing the example, the subset of the sensor data may comprise a video clip acquired by one or more cameras 120(1) having a field of view 128 that includes the item 104. The tentative results may comprise the "best guess" as to which items 104 may have been involved in the event 124. For example, the tentative results may comprise results determined by the automated system that have a confidence level above a minimum threshold.

Furthermore, and as noted above, when a result of an event record is determined to be below a threshold confidence result, prior to sending the sensor data associated with the event 124 to the human associate, the inventor management system 122 may determine whether the record of the event 124 is to be merged with any other event records. If so, the inventor management system 122 may store an indication of the merged event and may send the user interface comprising inquiry data (e.g., a video clip, etc.) associated with the entire merged event to the computing device of the human associate.

In some instances, the user interface may also include supplemental data, such as the weight of the item 104, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 104 being removed from the inventory location 114. One or more of the tentative results associated with the identity of the item 104 may also be presented in the associate user interface. The associate may view the video clip and the supplemental data and make a selection from the tentative results to identify the item 104 was removed from the inventory location 114. The selection or other information generated by the associate comprises response data. The response data from one or more associates may be processed to generate the output data 126. For example, the majority of the associates may identify the item 104 that was picked from the inventory location 114 as "5 oz box powdered toast". Based at least in part on the majority selection, the inventory management system 122 may generate output data 126 indicating that the item 104 picked was "5 oz box powdered toast".

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102. The receiving of the items 104 may comprise one or more events 124 for which the inventory management system 122 may generate output data 126.

Upon being received from a supplier at receiving area 106, the items 104 may be prepared for storage. For example, items 104 may be unpacked or otherwise rearranged. The inventory management system 122 may include one or more software applications executing on a computer system to provide inventory management functions based on the events 124 associated with the unpacking or rearrangement. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114. Storage of the items 104 and their respective inventory locations 114 may comprise one or more events 124.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102. Picking may comprise one or more events 124, such as the user 116 in moving to the inventory location 114, retrieval of the item 104 from the inventory location 114, and so forth.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. The transitioning may comprise one or more events 124. Information about the transition may be maintained by the inventory management system 122 using the output data 126 associated with those events 124.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102. The purchase or rental may comprise one or more events 124.

During use of the facility 102, the user 116 may move about the facility 102 to perform various tasks, such as picking or placing the items 104 in the inventory locations 114. Pluralities of users 116 may move past one another, travel in groups, may coalesce into groups, groups may break apart, and so forth. These movements may comprise one or more events 124. For example, an event 124 may comprise a plurality of users 116 moving past one another in the aisle 112.

The inventory management system 122 may access or generate sensor data about the facility 102 and the contents therein including the items 104, the users 116, the totes 118, and so forth. The sensor data may be acquired by one or more of the sensors 120, data provided by other systems, and so forth. For example, the sensors 120 may include cameras 120(1) configured to acquire image data of scenes in the facility 102. The image data may comprise still images, video, or a combination thereof. The image data may be processed by the inventory management system 122 to determine a location of the user 116, the tote 118, the identity of the user 116, and so forth. As used herein, the identity of the user may represent a unique identifier of the user (e.g., name, number associated with user, username, etc.), an identifier that distinguishes the user amongst other users being tracked with the environment, or the like. The sensors 120 are discussed in more detail below with regard to FIG. 2.

The inventory management system 122, or systems coupled thereto, may be configured to identify the user 116, as well as to determine other candidate users. In one implementation, this determination may comprise comparing sensor data with previously stored identity data. For example, the user 116 may be identified by showing their face to a facial recognition system, by presenting a token carrying authentication credentials, providing a fingerprint, scanning a barcode or other type of unique identifier upon entering the facility, and so forth. Identity of the user 116 may be determined before, during, or after entry to the facility 102. Determination of the user's 116 identity may comprise comparing sensor data associated with the user 116 in the facility 102 to previously stored user data.

In some instances, the inventory management system group users within the facility into respective sessions. That is, the inventory management system 122 may utilize the sensor data to determine groups of users that are effectively "together" (e.g., shopping together). In some instances, a particular session may include multiple users that entered the facility 102 together and, potentially, that navigate the facility together. For example, when a family of two adults and two children enter the facility together, the inventory management system may associate each user with a particular session. Tracking sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 118. Noting the child and the mother as belonging to the same session may increase the chances of successfully adding the box of cereal to the virtual shopping cart of the mother.

By determining the occurrence of one or more events 124 and the output data 126 associated therewith, the inventory management system 122 is able to provide one or more services to the users 116 of the facility 102. By utilizing one or more human associates to process inquiry data and generate response data that may then be used to produce output data 126, overall accuracy of the system may be enhanced. The enhanced accuracy may improve the user experience of the one or more users 116 of the facility 102.

Figure 2:
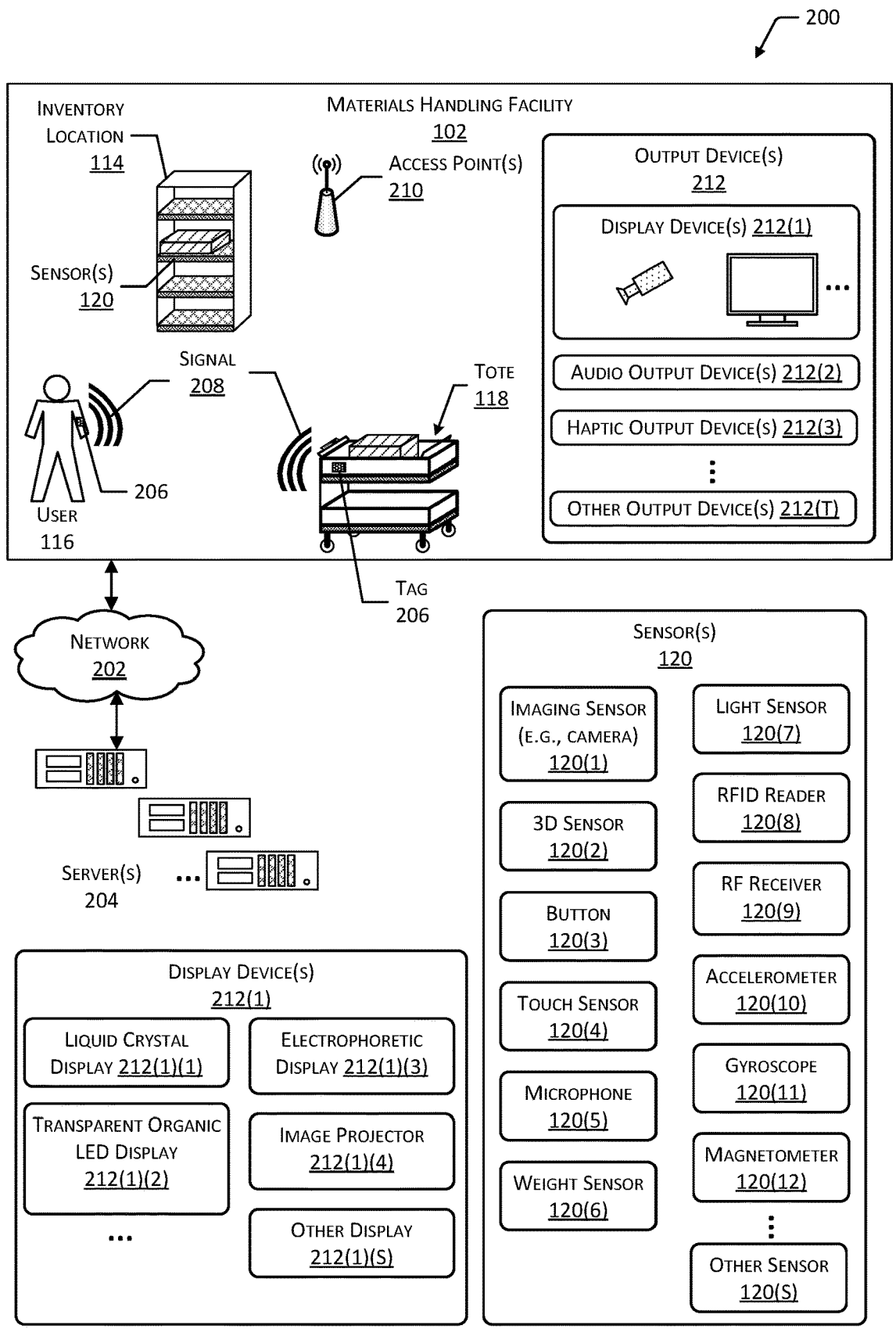
FIG. 2 is a block diagram illustrating additional details of the facility, including example sensors that may facilitate maintaining accurate states of virtual shopping carts of users within the facility.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206, such as radio frequency (RF) tags. The tags 206 may be configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence. For example, an acoustic tag 206 may be configured to generate an ultrasonic signal which is detected by corresponding acoustic receivers. In yet another implementation, the tag 206 may be configured to emit an optical signal.

The inventory management system 122 may be configured to use the tags 206 for one or more of identification of the object, determining a location of the object, and so forth. For example, the users 116 may wear tags 206, the totes 118 may have tags 206 affixed, and so forth, which may be read and, based at least in part on signal strength, used to determine identity and location. Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, may be carried or worn by the user 116, and so forth. The sensors 120 produce respective sensor data.

The sensors 120 may include one or more cameras 120(1). These cameras 120(1) may include cameras configured to acquire images of a scene. The cameras 120(1) are configured to detect light in one or more wavelengths including, but not limited to, terahertz, infrared, visible, ultraviolet, and so forth. The cameras 120(1), as well as any image sensors described herein, may provide sensor data in the form of the image data, in the form of indications of what item was picked or return and the location of the item, combinations thereof, and/or the like. The inventory management system 122 may use image data acquired by the cameras 120(1) during operation of the facility 102. For example, the inventory management system 122 may identify items 104, identify users 116, identify totes 118, determine a location, and so forth, based at least in part on their appearance within the image data.

One or more three-dimensional (3D) sensors 120(2) may also be included in the sensors 120. The 3D sensors 120(2) are configured to acquire spatial or 3D data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the 3D data acquired to identify objects, determine a location of an object, and so forth. For example, the inventory management system 122 may determine operational data such as location in the facility 102 of the user 116 based at least in part on the location in 3D space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116 and produce button data.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment and generate audio data. In some implementations, arrays of microphones 120(5) may be used. These arrays may implement beamforming techniques to provide for directionality of gain. The inventory management system 122 may use the one or more microphones 120(5) to acquire information from acoustic tags, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth and generate weight data. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 122 may use the data acquired by the weight sensors 120(6) to identify an object, determine a location of an object, maintain shipping records, identify the user 116, and so forth. In addition to the weight data, the weight sensors 120(6) may send an indication of an item picked or returned and a location of the item, an indication of a cost of an item removed, combinations there, and/or the like. Further, each of the sensors 120 may provide this type of data.

The sensors 120 may include one or more light sensors 120(7) configured to generate light sensor data. The light sensors 120(7) may be configured to provide information associated with ambient lighting conditions such as a level of illumination. Information acquired by the light sensors 120(7) may be used by the inventory management system 122 to adjust a level, intensity, or configuration of the user interface.

One more radio frequency identification (RFID) readers 120(8), near field communication (NFC) systems, and so forth, may also be provided in the sensors 120. For example, the RFID readers 120(8) may be configured to read the tags 206 and generate RFID tag data. Information acquired by the RFID reader 120(8) may be used by the inventory management system 122 to identify an object associated with the tag 206 such as the item 104, the user 116, the tote 118, and so forth. For example, based on information from the RFID readers 120(8), a velocity of the tag 206 may be determined.

One or more RF receivers 120(9) may also be provided in the sensors 120 to generate radio-frequency data. In some implementations, the RF receivers 120(9) may be part of transceiver assemblies. The RF receivers 120(9) may be configured to acquire RF signals 208 associated with Wi-Fi™, Bluetooth®, ZigBee®, Z-Wave, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10) that may be worn or carried by the user 116, mounted to the tote 118, and so forth. The accelerometers 120(10) may provide accelerometer data such as the direction and magnitude of an imposed acceleration. Data such as rate of acceleration, determination of changes in direction, speed, and so forth, may be determined using the accelerometers 120(10).

A gyroscope 120(11) provides gyroscope data indicative of rotation of an object affixed thereto. For example, the tote 118, the user 116, or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may generate magnetometer data indicative of the direction, strength, and so forth of a magnetic field. The magnetometer 120(12) may be worn or carried by the user 116, mounted to the tote 118, and so forth. For example, the magnetometer 120(12) mounted to the tote 118 may act as a compass and provide information indicative of which way the tote 118 is oriented.

The sensors 120 may include other sensors 120(S) as well. For example, the other sensors 120(S) may include proximity sensors, ultrasonic rangefinders, thermometers, barometric sensors, hygrometers, biometric input devices including, but not limited to, fingerprint readers or palm scanners, and so forth. For example, the inventory management system 122 may use information acquired from thermometers and hygrometers in the facility 102 to direct the user 116 to check on delicate items 104 stored in a particular inventory location 114.

The facility 102 may include one or more access points 210 configured to establish one or more wireless networks and the network 202. The access points 210 may use Wi-Fi™, NFC, Bluetooth®, or other technologies to establish wireless communications between a device and the network 202. The wireless networks allow the devices to communicate with one or more of the inventory management system 122, the sensors 120, the tag 206, a communication device of the tote 118, or other devices.

Output devices 212 may also be provided in the facility 102. The output devices 212 are configured to generate signals which may be perceived by the user 116. The output devices 212 may include display devices 212(1), audio output devices 212(2), haptic output devices 212(3), or other output devices 212(T).

The display devices 212(1) may be configured to provide output which may be seen by the user 116 or detected by a light-sensitive detector such as an camera 120(1) or light sensor 120(7). The output may be monochrome or color. The display devices 212(1) may be emissive, reflective, or both. An emissive display device 212(1) is configured to emit light during operation. For example, a light emitting diode (LED) is an emissive visual display device 212(1). In comparison, a reflective display device 212(1) relies on ambient light to present an image. For example, an electrophoretic display 212(1)(3) is a reflective display device 212(1). Backlights or front lights may be used to illuminate the reflective visual display device 212(1) to provide visibility of the information in conditions where the ambient light levels are low.

Mechanisms of the display devices 212(1) may include liquid crystal displays 212(1)(1), transparent organic LED displays 212(1)(2), electrophoretic displays 212(1)(3), image projectors 212(1)(4), or other displays 212(1)(S). The other displays 212(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 212(1) may be configured to present images. For example, the display devices 212(1) may comprise a pixel-addressable display. The image may comprise at least a two-dimensional array of pixels or a vector representation of an at least two-dimensional image.

In some implementations, the display devices 212(1) may be configured to provide non-image data, such as text characters, colors, and so forth. For example, a segmented electrophoretic display 212(1)(3), segmented LED, and so forth, may be used to present information such as a stock keeping unit (SKU) number. The display devices 212(1) may also be configurable to vary the color of the text, such as using multicolor LED segments.

In some implementations, display devices 212(1) may be configurable to provide image or non-image output. For example, an electrophoretic display 212(1)(3) with addressable pixels may be used to present images of text information, or all of the pixels may be set to a solid color to provide a colored panel.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

Haptic output devices 212(3) are configured to provide a signal which results in a tactile sensation to the user 116. The haptic output devices 212(3) may use one or more mechanisms such as electrical stimulation or mechanical displacement to provide the signal. For example, the haptic output devices 212(3) may be configured to generate a modulated electrical signal, which produces an apparent tactile sensation in one or more fingers of the user 116. In another example, the haptic output devices 212(3) may comprise piezoelectric or rotary motor devices configured to provide a vibration, which may be felt by the user 116.

The facility 102 may include an interface device that comprises the sensors 120, the output devices 212, or both. For example, the tote 118 may include an interface device such as a display device 212(1) and a touch sensor 120(4). In some implementations, the interface device may include hardware processors, memory, and other elements configured to present a user interface, process input to the user interface, and so forth. Users 116, associates, or both users 116 and associates may use the interface device.

Other output devices 212(T) may also be present. For example, the other output devices 212(T) may include scent/odor dispensers, document printers, 3D printers or fabrication equipment, and so forth.

The inventory management system 122 may generate user interface data, which is then used by the interface device to present the user interface. The user interface may be configured to stimulate one or more senses of the user 116 or associate. For example, the user interface may comprise visual, audible, and haptic output.

Figure 3:
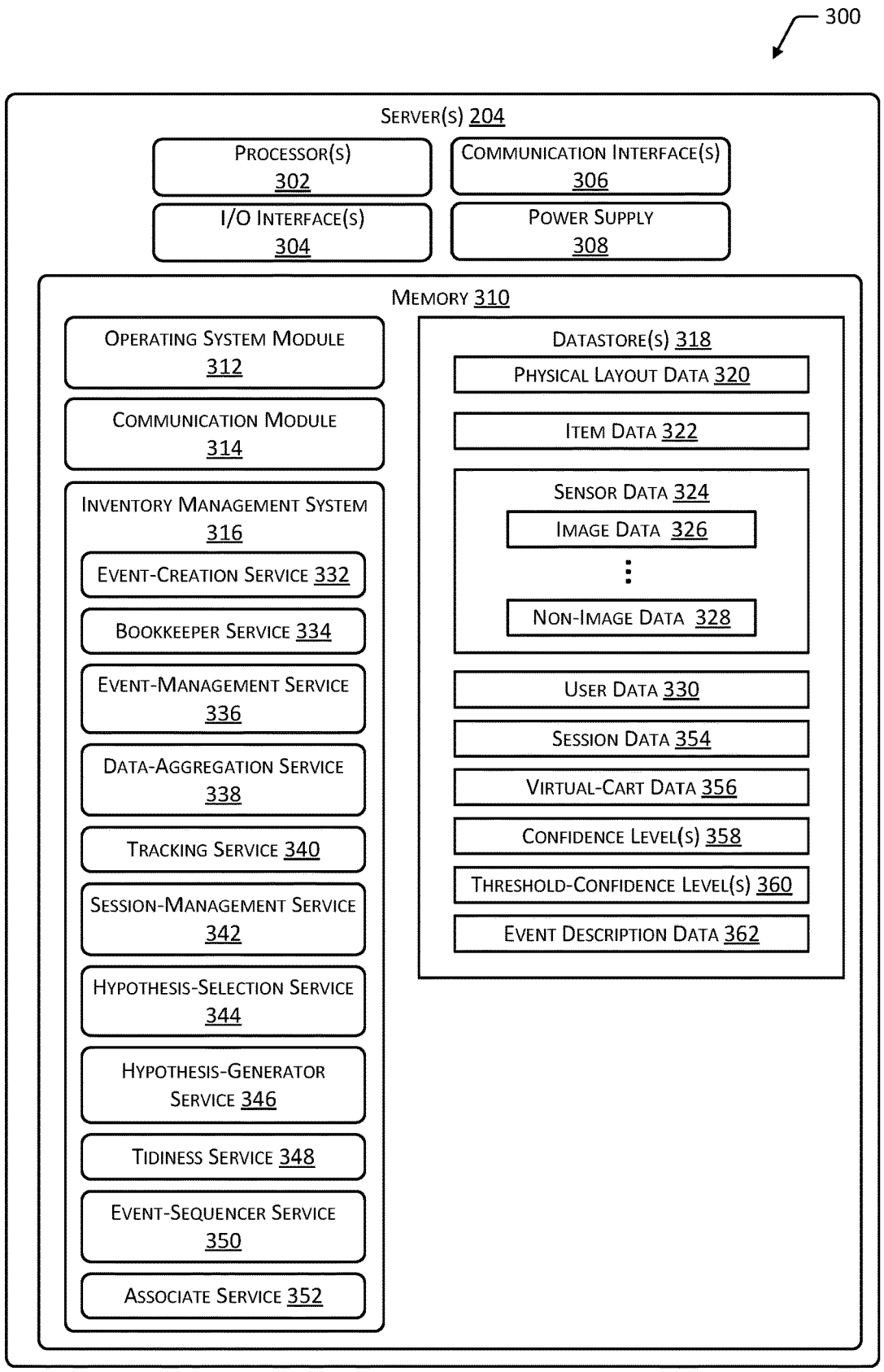
FIG. 3 illustrates a block diagram of one or more servers configured to support operation of the facility. As illustrated, the servers may host an inventory management system configured to maintain the state of the virtual shopping carts.

FIG. 3 illustrates a block diagram 300 of the one or more servers 204. The servers 204 may be physically present at the facility 102, may be accessible by the network 202, or a combination of both. The servers 204 does not require end-user knowledge of the physical location and configuration of the system that delivers the services. Common expressions associated with the servers 204 may include "on-demand computing," "software as a service (SaaS)," "platform computing," "network-accessible platform,"

"cloud services," "data centers," and so forth. Services provided by the servers 204 may be distributed across one or more physical or virtual devices.

The servers 204 may include one or more hardware processors 302 (processors) configured to execute one or more stored instructions. The processors 302 may comprise one or more cores. The servers 204 may include one or more input/output (I/O) interface(s) 304 to allow the processor 302 or other portions of the servers 204 to communicate with other devices. The I/O interfaces 304 may comprise Inter-Integrated Circuit (I2C), Serial Peripheral Interface bus (SPI), Universal Serial Bus (USB) as promulgated by the USB Implementers Forum, RS-232, and so forth.

The servers 204 may also include one or more communication interfaces 306. The communication interfaces 306 are configured to provide communications between the servers 204 and other devices, such as the sensors 120, the interface devices, routers, the access points 210, and so forth. The communication interfaces 306 may include devices configured to couple to personal area networks (PANs), wired and wireless local area networks (LANs), wired and wireless wide area networks (WANs), and so forth. For example, the communication interfaces 306 may include devices compatible with Ethernet, Wi-Fi™, and so forth. The servers 204 may also include one or more busses or other internal communications hardware or software that allow for the transfer of data between the various modules and components of the servers 204.

The servers 204 may also include a power supply 308. The power supply 308 is configured to provide electrical power suitable for operating the components in the servers 204.

As shown in FIG. 3, the servers 204 includes one or more memories 310. The memory 310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the servers 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the communication interfaces 306, and provide various services to applications or modules executing on the processors 302. The OS module 312 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following modules may also be stored in the memory 310. These modules may be executed as foreground applications, background tasks, daemons, and so forth.

A communication module 314 may be configured to establish communications with one or more of the sensors 120, one or more of the devices used by associates, other servers 204, or other devices. The communications may be authenticated, encrypted, and so forth.

The memory 310 may store an inventory management system 316. The inventory management system 316 is configured to provide the inventory functions as described herein with regard to the inventory management system 122. For example, the inventory management system 316 may track movement of items 104 in the facility 102, generate user interface data, and so forth.

The inventory management system 316 may access information stored in one or more data stores 318 in the memory 310. The data store 318 may use a flat file, database, linked list, tree, executable code, script, or other data structure to store the information. In some implementations, the data store 318 or a portion of the data store 318 may be distributed across one or more other devices including other servers 204, network attached storage devices, and so forth.

The data store 318 may include physical layout data 320. The physical layout data 320 provides a mapping of physical locations within the physical layout of devices and objects such as the sensors 120, inventory locations 114, and so forth. The physical layout data 320 may indicate the coordinates within the facility 102 of an inventory location 114, sensors 120 within view of that inventory location 114, and so forth. For example, the physical layout data 320 may include camera data comprising one or more of a location within the facility 102 of an camera 120(1), orientation of the camera 120(1), the operational status, and so forth. Continuing example, the physical layout data 320 may indicate the coordinates of the camera 120(1), pan and tilt information indicative of a direction that the field of view 128 is oriented along, whether the camera 120(1) is operating or malfunctioning, and so forth.

In some implementations, the inventory management system 316 may access the physical layout data 320 to determine if a location associated with the event 124 is within the field of view 128 of one or more sensors 120. Continuing the example above, given the location within the facility 102 of the event 124 and the camera data, the inventory management system 316 may determine the cameras 120(1) that may have generated images of the event 124.

The item data 322 comprises information associated with the items 104. The information may include information indicative of one or more inventory locations 114 at which one or more of the items 104 are stored. The item data 322 may also include order data, SKU or other product identifier, price, quantity on hand, weight, expiration date, images of the item 104, detail description information, ratings, ranking, and so forth. The inventory management system 316 may store information associated with inventory management functions in the item data 322.

The data store 318 may also include sensor data 324. The sensor data 324 comprises information acquired from, or based on, the one or more sensors 120. For example, the sensor data 324 may comprise 3D information about an object in the facility 102. As described above, the sensors 120 may include an camera 120(1), which is configured to acquire one or more images. These images may be stored as the image data 326. The image data 326 may comprise information descriptive of a plurality of picture elements or pixels. Non-image data 328 may comprise information from other sensors 120, such as input from the microphones 120(5), weight sensors 120(6), and so forth.

User data 330 may also be stored in the data store 318. The user data 330 may include identity data, information indicative of a profile, purchase history, location data, images of the user 116, demographic data, and so forth. Individual users 116 or groups of users 116 may selectively provide user data 330 for use by the inventory management system 122. The individual users 116 or groups of users 116 may also authorize collection of the user data 330 during use of the facility 102 or access to user data 330 obtained from other systems. For example, the user 116 may opt-in to collection of the user data 330 to receive enhanced services while using the facility 102.

In some implementations, the user data 330 may include information designating a user 116 for special handling. For example, the user data 330 may indicate that a particular user 116 has been associated with an increased number of errors with respect to output data 126. The inventory management system 316 may be configured to use this information to apply additional scrutiny to the events 124 associated with this user 116. For example, events 124 that include an item 104 having a cost or result above the threshold amount may be provided to the associates for processing regardless of the determined level of confidence in the output data 126 as generated by the automated system.

The inventory management system 316 may include one or more of an event-creation service 332, a bookkeeper service 334, an event-management service 336, a data-aggregation service 338, a tracking service 340, a session-management service 342, a hypothesis-selection service 344, a hypothesis-generator service 346, a tidiness service 348, an event-sequencer service 350, and an associate service 352. The event-creation service 332 may function to receive a set of sensor data indicative of an occurrence of an event within the facility 102. In response, the event-creation service 332 may initially verify that the sensor data does in fact potentially represent an event prior to taking further action. That is, the event-creation service 332 may apply one or more heuristics to the data to ensure that the sensor data is simply noise (e.g., the shaking of a shelf rather than the removal of an item) rather than an event. If the event-creation service 332 determines that the data is indicative of an event, the event-creation service 332 may create a unique identifier associated with the event and provide the identifier to the bookkeeper service 334. The bookkeeper service 334 may then create an event record indicative of the event and store the event record designated by the event identifier in a database, such as the data store 318.

In addition to the above, the event-creation service 332 may send the sensor data, a location to the sensor data, in an indication of the event to the event-management service 336. The event-management service 336 may then generate an shopping-event summary file that includes the identifier of the event (as received from the event-creation service 332) and that includes one or more fields to be filled by data-aggregation service 338. In some instances, the fields of the file may include one or more of the person(s) associated with the event (e.g., the person that picked an item, returned an item, etc.), the item(s) associated with the event (e.g., the identifier of the item(s), the quantity, etc.), and the action(s) taken with respect to the item(s) (e.g., noting that an item was picked, that an item was returned, that a user left the store, etc.). In some instances, the field indicating the person(s) associated with the event may indicate both a person (or more) that is determined to be most likely to be associated with the event as well as one or more other candidate people that may have been associated with the event. For instance, the former may be identified as having the highest confidence level in association with the event, while the latter may comprise the next "N" number of people ranked according to confidence level (or the number of "N" people having confidence levels associated with the event that is greater than a threshold).

After generating the shopping-event summary file, the event-management service 336 may provide this file (generally unfilled) to the data-aggregation service 338, potentially along with the sensor data or information indicating a network location the sensor data. The data-aggregation service 338 may then proceed to attempt to fill in the remaining fields of the file. For instance, the data-aggregation service 338 (or another service, such as the event-management service 336) may determine a time associated with the event and a location associated with the event for the purpose of determining the user most likely associated with the event. That is, the data-aggregation service 338 may analyze the sensor data to determine the time (e.g., the time range) at which the event occurred, as well as a location within the facility 102 at which the event occurred (e.g., a particular lane and/or shelf of the facility 102). The data-aggregation service 338 may then provide an indication of the time and location of the event to the tracking service 340.

The tracking service 340, meanwhile, functions to track users within the environment of the facility to allow the inventory management system 316 to assign certain events to the correct users. That is, the tracking service 316 may assign unique identifiers to users as they enter the facility and, with the users' consent, may track the users throughout the facility 102 over the time they remain in the facility 102. As discussed above, the tracking service 340 may perform this tracking using sensor data 324, such as the image data 326. For example, the tracking service 340 may receive the image data 326 and may use facial-recognition techniques to identify users from the images. After identifying a particular user within the facility, the tracking service 340 may then track the user within the images as the user moves throughout the facility 102. Further, should the tracking service 340 temporarily "lose" a particular user, the tracking service 340 may again attempt to identify the users within the facility based on facial recognition, and/or using other techniques such as voice recognition, or the like.

Therefore, upon receiving the indication of the time and location of the event in question, the tracking service 340 may query the data store 318 to determine which one or more users were at or within a threshold distance of the location of the event at the particular time of the event. Further, the tracking service 340 may assign different confidence levels to different users, with the confidence levels indicating how likely it is that each corresponding user is the user that is in fact associated with the event of interest. In some instances, the tracking service 340 returns, to the data-aggregation service 338, an identity of the user having the highest confidence level with respect to the event, as well as one or more additional identities of users having lower confidence (e.g., confidence levels that are less than the highest level but above a threshold confidence level). In response to receiving this information, the data-aggregation service 338 may fill out the corresponding portions of the shopping-event summary form. That is, the data-aggregation service 338 may indicate the identity of the user associated with the user determined to most likely be associated with the event. In some instances, the data-aggregation service 338 may also indicate, on the shopping-event summary filed the identities of the other users determined to be candidates for the event.

After receiving the user identities from the tracking service 340, the data-aggregation service 338 may attempt determine the identity of any users associated with a session of the user associated with the event as well as the identities of any users associated with a session of the candidate users. To do so, the data-aggregation service 338 may send indications of the identities of the user and the candidate user(s) to a session-management service 342. The session-management service 342 may function to identify users within the facility 102 that are to be treated as related to one another for the purpose of determining the occurrence of events. For instance, the session-management service 342 may determine that three people that walk into the store together are to be associated with a particular session (denoted by a particular session identifier). Additionally or alternatively, the session-management service 342 may determine that two users are family members and, thus, are to be associated with a common session when they are within the same facility 102 at the same time-of-day. After making these determinations, the session-management service 342 may then store an indication of the respective sessions in the data store 318 as session data 354. The session data 354 may identify which users are associated with which sessions.

In other instance, a session may comprise two user identifiers that, while unique relative to one another, are actually associated with the same user. For instance, envision that the tracking service 340 tracks a particular user but loses track of the user while the user remains in the facility. Thereafter, the tracking service 340 begins tracking a user (the same particular user). While the user may comprise the same user, the tracking service 340 may simply create a new user identifier for the newly tracked individual, being initially unaware that it is in fact the same user. Therefore, when the tracking service 340 determines that the user is in fact the particular user, the session-management service may 342 associate the new user identifier with the session identifier to which the initial user identifier of the particular user was associated.

Upon receiving the user identitie(s), the session-management service 342 may determine any sessions that the users are a part of and may return respective identities of any other users that are associated with those particular sessions. The session-management service 342 may then return this information back to the data-aggregation service 338. The data-aggregation service 338 may then acquire, from the data store 318, virtual cart data 356 for these users. That is, the data-aggregation service 338 may acquire: (1) the current state of the virtual shopping cart for the user determined to most likely be associated with the event, (2) the current state of the virtual shopping cart for the candidate users, and (3) the current state of the virtual shopping cart for other users associated with the respective session of the users from (1) and (2).

In addition, the data-aggregation service 338 may request, from the hypothesis-selection service 344, an indication of a particular hypothesis generator to call of determining the information regarding the item(s) associated with the event and the actions likely taken. In response, the hypothesis-selection service 344 may select which hypothesis generator of multiple hypothesis-generator should be used by the data-aggregation service 338 to determine the outcome of the event. For instance, the service 344 may send an indication of a network location (e.g., a uniform resource locator (URL) address) to the data-aggregation service 338. In some instances, the service 344 make this selection based on one or more parameters associated with the event, such based on an attribute of the sensor data. In one instance, the service 344 selects a particular hypothesis generator based on an attribute of the sensor data, such as which sensor(s) provided the sensor data.

Upon receiving the network location of the selected hypothesis generator, the data-aggregation service 338 may provide the sensor data (or information for obtaining the sensor data) and the current states of the applicable virtual shopping carts (or information for obtaining the virtual carts) to the hypothesis-generator service 346. In some instances, the hypothesis-generator service 346 stores or otherwise has access to multiple different hypothesis generators, as discussed immediately above. Each hypothesis generator, meanwhile, may function to algorithmically determine information regarding an event based, such as the item(s) associated with the event, the actions taken with respect to the event, and the like. In some instances, the hypothesis-generator service 346 may also make this determination with reference to a state of the location of the event at the time of the event. For example, the hypothesis-generator service 348 may inquire to the tidiness service 348 whether the shelf or other location associated with the event was "tidy" or "untidy" at the time of the event. That is, the tidiness service 348 may maintain, for respective shelves or other locations over time, an indication of whether a particular shelf includes only the items it is supposed to include (e.g., only cans of peaches on a peach shelf) or whether it contains one or more other items that is not designated for that shelf or location (e.g., the peach shelf including ajar of green beans). Based on analysis of the cart contents, the identified user(s), the tidiness of the location of the event at the time of the event, and potentially other factors, the selected hypothesis generator may analyze the sensor data in view of current contents of the user most likely to be associated with the event to determine what occurred during the time associated with the event. As described above, the result may be that a user picked a particular item, returned a particular item, or the like. In some instances, the hypothesis generator comprises one or more models that have been trained using known data. For instance, the models may be trained using input sensor and an indication of the actual items picked, returned, or the like. After training each respective model, the hypothesis generator may be used to generate a respective outcome of the respective event. That is, the hypothesis generator may compare the one or more models to incoming sensor data to determine the most likely outcome, as well as probabilities associated with other potential outcomes.

The hypothesis-generator service 346 may then provide an indication of the item(s) and the corresponding action(s) back to the data-aggregation service 338. In addition, the hypothesis-generator service 346 may calculate, and provide back to the data-aggregation service 338, a confidence level associated with the item, a confidence level associated with the action, a confidence level associated with both, or the like. In addition, if the hypothesis generator determined that the shelf or other location associated with the event changed from tidy to untidy (or vice versa) based on its analysis, then the hypothesis-generator service 346 may provide this indication to the data-aggregation service 338.

The data-aggregation service 338 may then update the shopping-event summary file to indicate the item(s), action(s), and confidence values and may send the now-completed file back to the event-management service 336. The event-management service 336 may then update the data store 318 to indicate the item(s), action(s), and confidence level(s). For instance, the event-management service 336 may store the confidence level(s) 358 in the data store 318 and may update the virtual-cart data 356 associated with the user determined to be associated with the event. In addition, the event-management service 336 may also send the completed event-summary file including the identity of the user and the indication of the item and the action taken with respect to the item to an event-sequencer service 350 that maintains a timeline of events that occur within the facility. The event-sequencer service 350 may determine whether the event is out-of-order which respect to other processed events, as described below with reference to FIGS. 11a-11c and 12a-12d.

FIG. 3 illustrates that information regarding a particular event may be stored as event description data 360 in one of the data stores 318. Additionally, if the data-aggregation service 338 indicated that the shelf or other location associated with the event has changed from tidy to untidy (or vice versa), the event-management service 336 may send an indication to the tidiness service 348, which may update its database.

Finally, the event-management service 336 may send an indication to the bookkeeper service 334 to indicate that the event, identified by its unique identifier, is now complete. In response, the bookkeeper service 334 may update the event record in the data store 318 to indicate that the event has been completed.

The associate service 352, meanwhile, may monitor the outcome of the event to determine whether to take further action on the event. That is, the associate service 352 may compare the confidence level associated with a particular completed event to a threshold-confidence level 360 to determine whether human confirmation is needed regarding the outcome of the event. If the confidence level for the event as determined by the hypothesis-generator service 346 is greater than the threshold-confidence level 360, then the associate service 352 may an indication that the event is complete to the bookkeeper service 334. Having now received an indication of completion from both the event-management service 336 and the associate service 352, the bookkeeper service 334 may now mark the outcome of the event as complete and determinative.

If, however, the associate service 352 determines that the confidence level of the event is less than the threshold-confidence level 360, then the associate service 352 may initiate a process for human involvement regarding the outcome of the event. For instance, the associate service 352 may send the sensor data or information for obtaining the sensor data to one or more devices of human associates. These associates may analyze the data (e.g., watch a video clip, etc.) and provide output data indicative of the result of the event (e.g., the item involved, the action taken, etc.). The associate service 352 may then receive this output data and, if the output data differs from the results of the previous event, sends a request to generate a new event to the event-creation service 332, which creates and sends a new event identifier to the bookkeeper service. The event-creation service 332 may also send an indication of the new event to the event-management service 336, which may generate a new shopping-event summary form, in this instance filled out with the output data provided by the associate service 352. The event-management service 336 may also send a request to cancel the previous event record, identified with its unique identifier, to event-sequencer service 350 and may undo the previous update to the state of the virtual-cart data 356. The output data of the new event, meanwhile, may result in the updating of a different virtual cart, the same virtual cart in a different manner, and/or the like.

Figure 4:
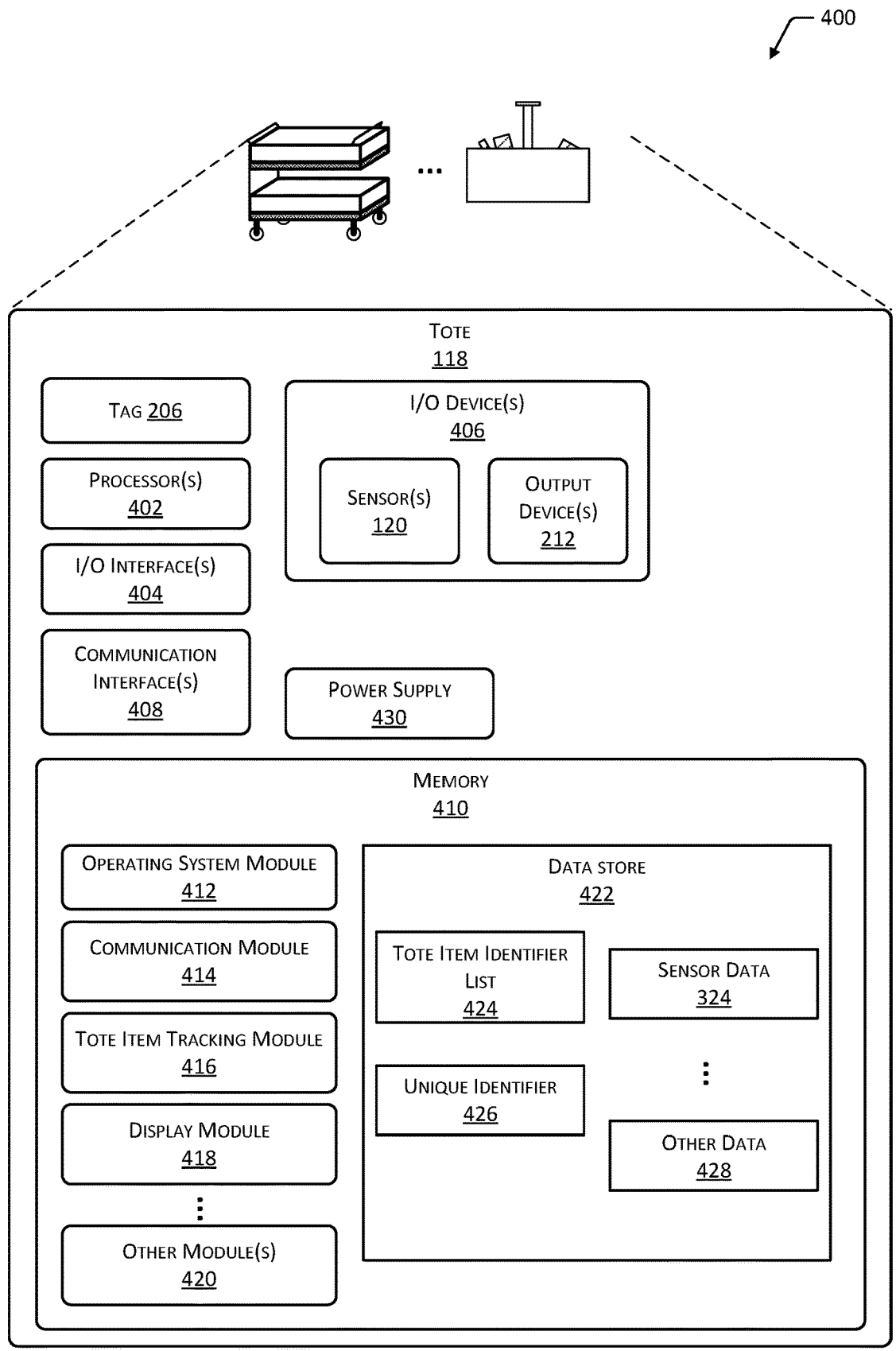
FIG. 4 is a block diagram of a tote that users may employ within the example facility of FIG. 1.

FIG. 4 illustrates a block diagram 400 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

The tote 118 may include a tag 206. The tag 206 may be affixed to, integral with, or otherwise associated with the tote 118. In some implementations, the tote 118 may have identifiers, tags 206, or other indicia thereupon. For example, a machine-readable optical code, such as a barcode, may be affixed to a side of the tote 118.

The tote 118 may include one or more hardware processors 502 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include cameras 120(1), weight sensors 120(6), RFID readers 120(8), and so forth. The I/O devices 406 may also include output devices 212 such as display devices 212(1), audio output devices 212(2), haptic output devices 212(3), and so forth.

The tote 118 may also include one or more communication interfaces 408. The communication interfaces 408 are configured to provide communications between the tote 118 and other devices, such as other totes 118, interface devices, routers, access points 210, the servers 204, and so forth. The communication interfaces 408 may include devices configured to couple to PANs, LANs, WANs, and so forth. For example, the communication interfaces 508 may include devices compatible with Ethernet, Wi-Fi™, Bluetooth®, ZigBee®, Z-Wave, 3G, 4G, LTE, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above with regard to memory 310 on servers 204. The memory 410 provides storage of computer readable instructions, data structures, program modules, and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD™ operating system as promulgated by the FreeBSD Project; other UNIX™ or UNIX-like variants; and a variation of the Linux™ operating system, such as Android® as promulgated by Google, Inc. of Mountain View, California, USA. Other OS modules 412 may be used, such as the Windows® operating system from Microsoft Corporation of Redmond, Washington, USA; the LynxOS® from LynuxWorks of San Jose, California, USA; and so forth.

One or more of the following modules may also be stored in the memory 410. These modules may be executed as foreground applications, background tasks, daemons, and so forth.

A communication module 414 may be configured to establish communications with one or more of the sensors 120, interface devices, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID reader 120(8) or NFC. The tote item tracking module 416 may send the list of items 104 to the inventory management system 122. The tote item tracking module 416 may also be configured to receive information from the inventory management system 122. For example, a list of items 104 to be picked may be presented within a user interface on the display device 212(1) of the tote 118.

The memory 410 may include a display module 418. The display module 418 may be configured to present information, such as received from the one or more servers 204 or generated onboard the tote 118, using one or more of the interface devices. For example, the display module 418 may comprise a rendering engine configured to process the user interface data received from the servers 204 to generate the user interface. In some implementations, the display module 418 may also process input made to the user interface by way of the input devices. In another implementation, the display module 418 may provide one or more of the functions described above with regard to the inventory management system 316.

Other modules 420 may also be stored within the memory 410. In one implementation, a data handler module may be configured to generate data indicative of the user 116, the tote 118, or another of one or more objects in range of the sensors 120 of the tote 118. The resulting sensor data 324 may be provided to the inventory management system 316. For example, image data 326 obtained from an camera 120(1) on the tote 118 may be provided by the associate service 352 to one or more associates.

The memory 410 may also include a data store 422 to store information. The data store 422 may use a flat file, database, linked list, tree, executable code, script, or other data structure to store information. In some implementations, the data store 422 or a portion of the data store 422 may be distributed across one or more other devices including the servers 204, other totes 118, network attached storage devices, and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable, non-volatile memory, such as a programmable read-only memory (PROM). In some implementations, the unique identifier 426 may be part of a communication interface 408. For example, the unique identifier 426 may comprise a media access control (MAC) address associated with a Bluetooth® interface.

The data store 422 may also store sensor data 324. The sensor data 324 may be acquired from the sensors 120 onboard the tote 118.

Other data 428 may also be stored within the data store 422. For example, tote configuration settings, user interface preferences, and so forth, may be stored in the data store 422.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
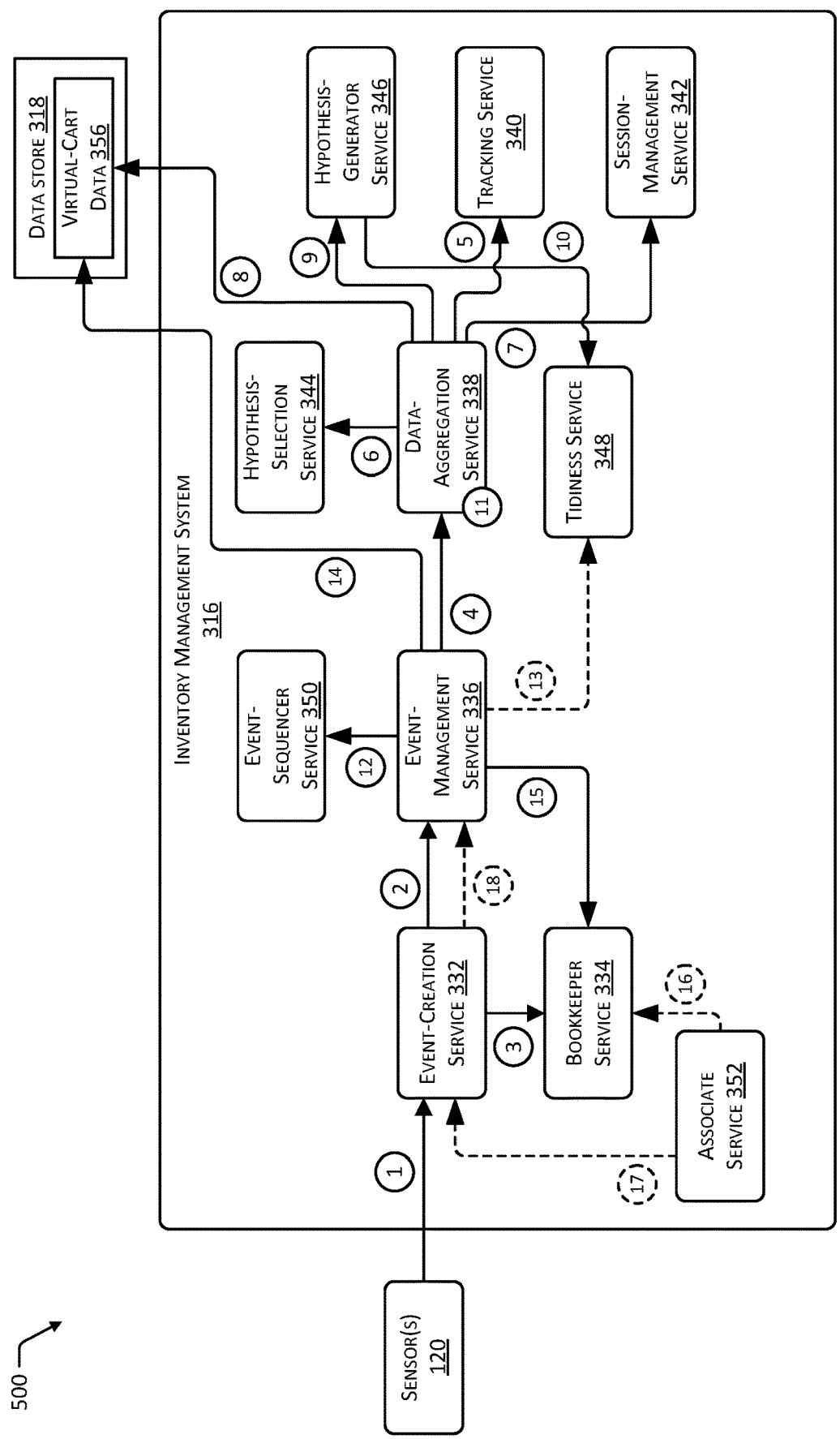
FIG. 5 illustrates a block diagram of an example inventory management system, as well as an example flow of data within the system for accurately maintaining virtual-shopping-cart states.

FIG. 5 illustrates a block diagram of an example inventory management system 316, as well as an example flow of data within the system 316 for accurately maintaining virtual-shopping-cart states. It is to be appreciated that while FIG. 5 illustrates an example flow of operations within the system 316, the system 316 may support other implementations.

At a first operation ("1"), one or more of the sensors 120 provide, to the event-creation service 332, sensor data indicative of an event that has occurred within the facility 102. The sensor data may have been acquired by one or more cameras, weight sensors, or the like. The sensor data may include an indication of time at which the sensor data was captured. That is, the sensor data may indicate, as metadata of the sensor data, an indication of a discrete time at which the data was captured, a time range of the sensor data, a start time of the sensor data, an end time of the sensor data, or the like. In other instances, the time data indicating the time at which the data was acquired may be appended to the sensor data or otherwise associated with the sensor data after acquiring the sensor data.

At "2", the event-creation service 332 sends the sensor data or information for acquiring the sensor data (e.g., a URL address where the sensor data is stored) to the event-management service 336. In some instances, the event-creation service 332 determines whether the sensor data in fact represents an event based on one or more heuristics or trained models prior to passing the sensor data to the service 336. In addition, after determining that the sensor data represents an event, at "3" the event-creation service 332 generates an identifier associated with an event and passes the identifier to the bookkeeper service 334. The bookkeeper service 334 generates an event record, having the unique identifier, corresponding to the event in the facility.

At "4", the event-management service 336 calls an application programming interface (API) provided by the data-aggregation service 338 and provides, to the service 338, a shopping-event summary file. This file may be associated with the identifier of the event (and corresponding event record) and may include one or more fields that are yet to be filled out. These fields may include the user associated with the event, one or more other candidate users potentially associated with the event, an indication of one or more users associated with a session of the user or the candidate users, contents of virtual shopping carts of each of the aforementioned users, one or more items associated with the event, and an indication of any actions taken with regards to the items.

At "5", the data-aggregation service 338 sends a request to the tracking service 340 an identity of a user associated with the event. To do so, the service 338 sends an indication of the time of the event and the location of the event in the facility 102 to the tracking service 340, which determines which user was most likely responsible for the actions of the event. The location data may include an indication of a shelf corresponding to the event, an aisle corresponding to the event, a gondola corresponding to the event, or the like. The tracking service 340 then provides this identity back to the data-aggregation service 338 and, potentially, one or more identities of other candidate users that are were located near the location of the event at the time of the event. The tracking service 340 may also send to the service 338 respective session identifiers indicating session to which the user belongs to and sessions to which the candidate users belong to.

At "6", the data-aggregation service 338 sends, to the hypothesis-selection service 344, a request for an indication of which of multiple hypothesis generators to call. In some instances, the hypothesis-generator service 346 utilizes multiple hypothesis generators based on predefined criteria, such as an attribute of the sensor data (e.g., the type of sensor that acquired the sensor data, the location of the sensor(s) within the facility 102, etc.). In some instances, the hypothesis-selection service 344 sends back, to the data-aggregation service 346, an indication of a location of the selected hypothesis generator (e.g., in the form of a URL address).

At "7", the data-aggregation service 338 sends a request to the session-management service 342 for identities of any users associated with respective sessions of the user determined to be associated with the event or the candidate users. As described above, a session may comprise a group of users that entered the facility 102 together, a group of user identifiers of a common user (that was temporarily dropped by the tracking service 340), or a group of users/user identifiers related in any manner. At "8", the data-aggregation 338 acquires, from the virtual-cart data 342 in the data store 318, information regarding states of respective virtual shopping carts of each of the users of the respective sessions, including the user determined to be associated with the event, other candidate users, and users associated with respective sessions of the user determined to be associated with the event and the other candidate users.

At "9", the data-aggregation service 338 sends, to the specified location of hypothesis-generator service 346, the sensor data (or a location for acquiring the sensor data) and the states of the virtual shopping carts (or a location for obtaining the states). At "10", the hypothesis-generator service 338 sends a request to the tidiness service 348 for an indication of whether the shelf or other location of the event was designated as tidy (including only the prescribed items for that particular shelf) or untidy (including one or a threshold number of items that do not belong on the shelf). After receiving this indication, the hypothesis-generator service 346 generates a hypothesis regarding the item(s) involved in the event, the action(s) taken with regard to the item(s), and, potentially, the user(s) responsible for the actions. Further, the hypothesis-generator service 346 may provide one or more confidence levels indicative of the service's confidence in these conclusions.

At "11", the data-aggregation service 338 fills out the remaining fields of the shopping-event summary file and provides the filled-out form back to the event-management service 336. At "12", the event-management service 336 provides the filled-out form to the event-sequencer service 350, which maintains a timeline of events that occur within the facility 102. The event-sequencer service 350 may determine whether the event record is in order of out-of-order. In the latter instances, the event-sequencer service 350 may trigger a reprocessing of one or more events, as described with references to FIGS. 11a-11c and 12a-12d.

At "13", if the hypothesis generated by the hypothesis-generator service 346 changes a state of a shelf (or other location of the event) from tidy to untidy (or vice versa), then the event-management service 336 sends a request to update the corresponding state to the tidiness service 348. At "14", event-management service 336 sends a request to update the state of one or more virtual shopping carts based on the hypothesis generated by the service 346. That is, the event-management service 336 updates the state of the virtual-cart data 346 for those users determined to have performed an action with respect to one or more items (e.g., picked an item, replaced an item on a shelf, etc.). At "15", the event-management service 336 sends a request to the bookkeeper service 334 to indicate, in the event record for the event, that the event has been completed.

As described above, the associate service 352 may determine whether to send the sensor data associated with the event to a human for confirmation (i.e., reanalysis). To make this determination, the service 352 may compare the confidence level of the generated hypothesis to a confidence-level threshold. If the former is greater than the latter, than at "16" the associate service 352 may, similar to the event-management service 336, send a request to the bookkeeper service 334 to indicate, in the event record for the event, that the event has been completed. Having received this indication of completion from both the event-management service 336 and the associate service 352, the bookkeeper service 334 may mark the hypothesis of the event as determinative.

If, however, the associate service 352 determines that the confidence level is less than the confidence-level threshold, then the service 352 sends the sensor data (or information for acquiring the sensor data, such as a URL address) to one or more computing devices associated with human associates. The associates then provide an indication of what they perceive as the item(s) and the action(s) taken with respect to the item(s) to the associate service 352.

At "17", the associate service 352 updates the hypothesis of the event and sends an indication of the updated event to the bookkeeper service 334. The associate service 352 may also send an indication to the bookkeeper service 334 that the associate service 352 is going to analyze the event (thus indicating that the event is not complete from the perspective of the associate service 352). At "18", the bookkeeper service enqueues the updated event as a new event by notifying the event-management service 336 of the new event. The service 336 proceeds to cancel the initial event (via a call to the event-sequencer service 350) and passes the new event on to the data-aggregation service 338. That is, the event-management service 336 passes a shopping-event summary form that is filled out with data from the associate service 352 to the data-aggregation service 338. The flow continues with the new event record essentially replacing the initial event record having the conclusion generated by the hypothesis-generator service 346.

Furthermore, and as discussed in further detail below with reference to FIGS. 9a-17, one or more events may need to be reprocessed based on the modification of the event via the generation of the new event record. For instance, if the result of the event changes in a way that affects a state of a virtual shopping cart of a particular user, then the event-sequencer service 350, or another service of the inventory management system 316, may trigger reprocessing of subsequent events that are associated with that particular user, as well as any users associated with a common session of that particular user. Further if the changed result of the event, or any subsequently reprocessed events, affects one or more other users, the event-sequencer service 350, or another service of the inventory management system 316, may trigger reprocessing of subsequent events that are associated with these additional users, as well as any other users associated with a common session as these additional users.

Further, While FIG. 5 illustrates one implementation of correcting the result of an event based on information received from the associate service 352, other implementations are possible. For instance, while FIG. 5 illustrates creating a new event record in response to the associate service updating the hypothesis of the event, in other instances the system 316 may instead update the existing event record. For instance, the associate service 352 may provide an indication of the new result (e.g., different user, different item, etc.) and the event-management service 336 or another service of the system 316 may update the event record. For instance, the service 336 may replace the identifier user of the record, the item of the record, the action of the record, and/or the like.

Figure 6:
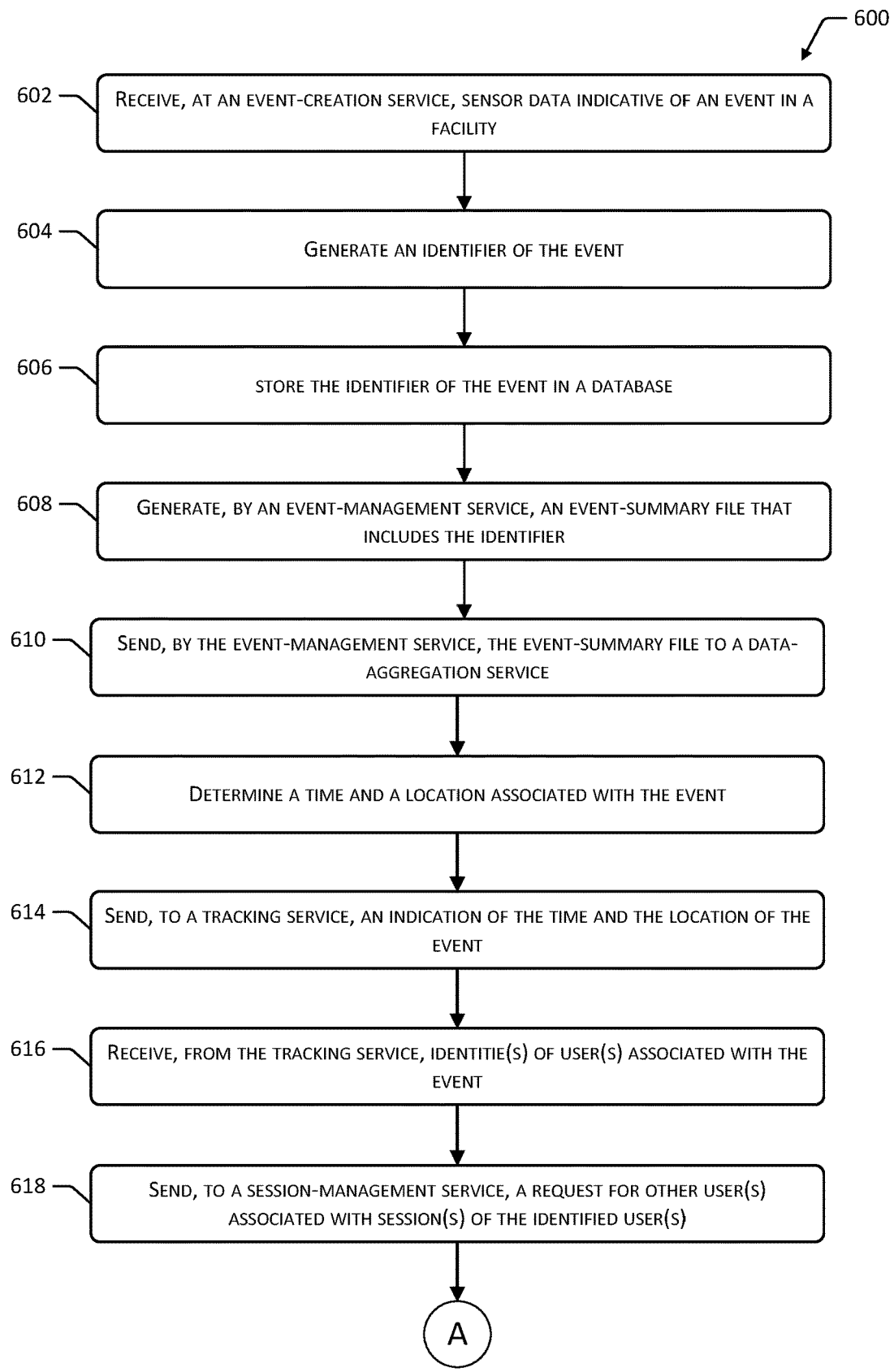
FIGS. 6-8 collectively illustrate a flow diagram of an example process for updating the state of a virtual shopping cart based on an event that occurs within the example facility of FIG. 1.
Figure 7:
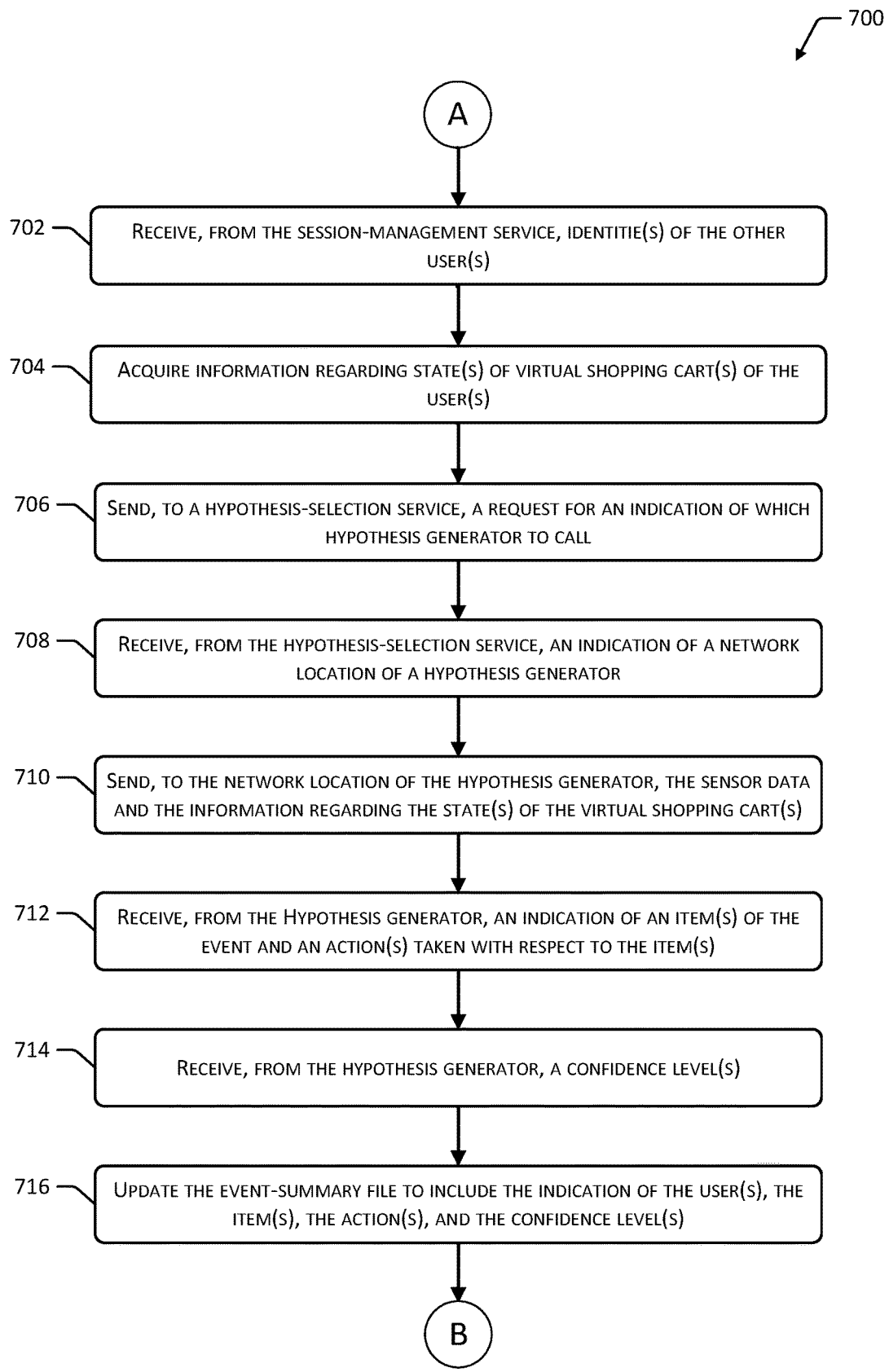
Figure 8:
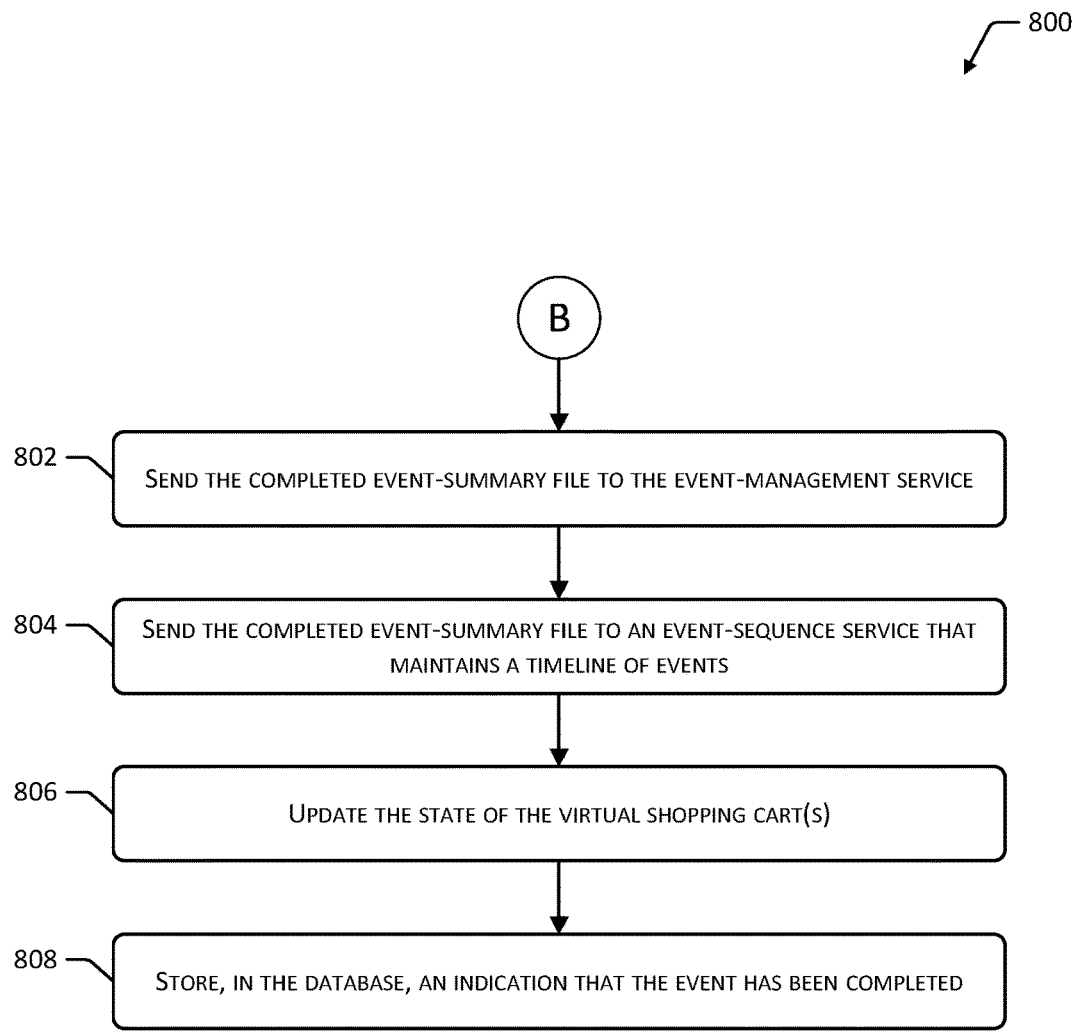

FIGS. 6-8 collectively illustrate a flow diagram of an example process for updating the state of a virtual shopping cart based on an event that occurs within the example facility of FIG. 1. In some instances, the process (illustrated via diagrams 600, 700, and 800) may be performed by the inventory management system described above. At 602, the inventory management system receives, at an event-creation service and from one or more sensors residing within a facility, sensor data associated with an event, the event comprising handling of an item from a shelf of the facility. At 604, the inventory management system generates an identifier for the event and, at 606, stores the identifier in a database in association with an event record. At 608, the inventory management system generates an event-summary file that includes the identifier of the event. At 610, the event-summary file is sent to a data-aggregation service. At 612, the data-aggregation service determine a time associated with the event and a location associated with the event based on the sensor data. At 614, the data-aggregation sends, to a tracking service that tracks respective locations of users within the facility, an indication of the time associated with the event and an indication of the location of the event within the facility. At 616, the data-aggregation service receives, from the tracking service, an identity of a user associated with the event. At 618, the data-aggregation service sends, to a session-management service, a request for an indication of other users associated with a session of the user (e.g., other users that that entered the facility with the user).

The flow diagram 700 continues the illustration of the process. At 702, data-aggregation service receives, from the session-management service, an identity of each other user that entered the facility with the user. At 704, the data-aggregation service acquires information regarding a respective account information of the user and each user that entered the facility with the user. The account information may comprise any information regarding the respective user's interactions at the facility, such as any of the information present in the user's virtual shopping cart (e.g., items picked, items returned, current items in cart, total cost of items, etc.) At 706, the data-aggregation service sends, to a hypothesis-selection service, a request for an indication of which hypothesis generator of multiple hypothesis generators to call, the hypothesis-selection service selecting a hypothesis generator based at least in part on an attribute of the sensor data. At 708, the data-aggregation service receives an indication of a network location of a selected hypothesis generator from the hypothesis-selection service. At 710, the data-aggregation service sends, to the location of the selected hypothesis generator, the sensor data and the information regarding the state of the virtual shopping cart of the user at the time associated with the event and each other user associated with the session. At 712, the data-aggregation service receives, from the hypothesis generator, an indication of the item of the event and an indication of an action of the user with respect to the item. At 714, the data-aggregation service receives, from the hypothesis generator, an indication of a confidence level associated with at least one of the user associated with the event, the item of the event, or the action of the user with respect to the item. At 716, the data-aggregation service updates the state of the virtual shopping cart of the user based at least in part on the indication of the item of the event and the indication of the action of the user taken with respect to the item.

The flow diagram 800 continues the illustration of the process. At 802, the data-aggregation service sends the completed event-summary file to the event-management service. At 804, the event-management service sends the event-summary file including the identity of the user and the indication of the item and the action taken with respect to the item to an event-sequencer service that maintains a timeline of events. At 806, the event-management service updates the state of the virtual shopping cart of the user based at least in part on the indication of the item of the event and the indication of the action of the user taken with respect to the item. At 808, the event-management service stores, in the database and in association with the identifier of the event, an indication that the event has been completed.

FIGS. 9a-9d collectively illustrate a schematic diagram of reprocessing a second event based on the result of an earlier, first event changing. In this example, the item associated with the first event changes while the user associated with the event remains the same. Thus, events associated with that user that have respective times later than the first event (e.g., the illustrated second event) are to be reprocessed. These figures, as well as subsequent figures, illustrates a timeline representing when particular event records are processed or recorded, without regard to the actual time at which the underlying event occurred. While the system 316 attempts to process event records in near-real-time as the occurrence of the associated events and, thus, in the same order as the occurrence of the events, in some instances event records will be processed out of order, as described below. Further, when an event is reprocessed, resulting in the deletion of one event record and addition of another (or modification of the existing event record for the event), subsequent events may be reprocessed to increase accuracy of the corresponding results, as described below.

Figure 9A:
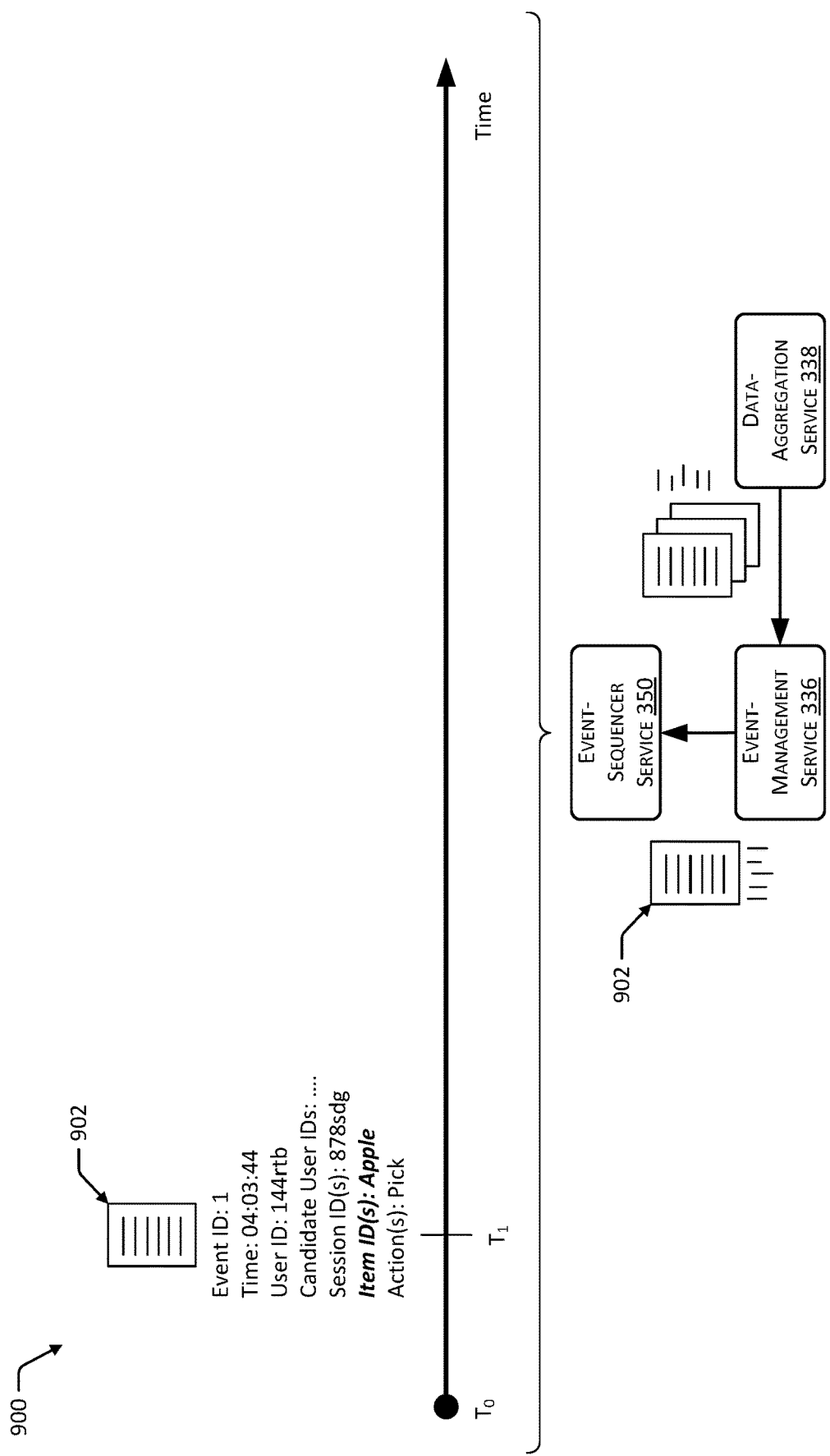

FIG. 9a illustrates that a time, $T_1$, a first event record 902 associated with a first event is passed from the event-management service 336 to the event-sequencer service 350, which maintains a timeline of events within the facility 102. It is noted that while FIG. 9a and subsequent figures describe event reprocessing with reference to the illustrated services, other services within the inventory management system 316 or other systems altogether may perform these techniques.

As illustrated, the event record includes an event identifier (in this instance "1"), a time associated with the underlying event, a user identifier of a user determined to be associated with the event, one or more other candidate user identifiers of one or more other users, a session identifier of the user (and potentially of the candidate users), an item identifier(s) of the item(s) associated with the event (and potentially a quantity of the item, and the action(s) taken by the user with respect to the item. While these examples describe example data that may be included in an event record, it is to be appreciated that other examples may include more or less data. For instance, the event record may include location data (e.g., an aisle identifier, a shelf identifier, etc.), an indication of the sensor data associated with the event, a network location where the sensor data is stored, and/or the like. The location data may indicate the aisle, gondola, shelf, etc. of the event in some instances. In other instances, the location data may indicate a location of a user associated with the event, x-y coordinates on a two-dimensional representation of the facility, x-y-z coordinates on a three-dimensional representation of the facility, or any other type of location data. Further, in this example, the time (04:03:44) may be determined from the sensor data associated with the result. While this example time represents a singular time (e.g., a beginning or end time of the underlying event), in other instances it may comprise a time range. That is, the time associated with the event may comprise a beginning time of the event as determined from the sensor data, an end time of the event as determined from the sensor data, a time range associated with the event determined from the sensor data, or any similar or different time(s) based on the sensor data or based on times associated with the sensor data.

Taken together, the event record 902 indicates that the inventory management system 316 has determined that the a user identifier ("144*rtb*") associated with a particular user picked an apple from a shelf at time 04:403:44. In this example, the hypothesis-generator service 346 analyzed the sensor data to make this determination, although in other examples the associate service 352 may make this determination.

FIG. 9*b* continues the example and illustrates the event-management service 336 sending a second event record 904 to the event-sequencer service 350 at time $T_2$. As illustrated, the event record 904 is associated with a second event identifier ("2"), a second time that is subsequent to the first time, the same user identifier, one or more candidate identifiers, the same session identifier, an identifier of an item associated with the event (in this case, the apple), and the action taken with respect to the item. In this instance, the example event record 904 indicates that the same user who picked the apple at 04:03:44 returned the apple to the shelf at 04:04:22. Again, in this example the hypothesis-generator service 346 analyzed the sensor data associated with this second event to make this determination.

Figure 9C:
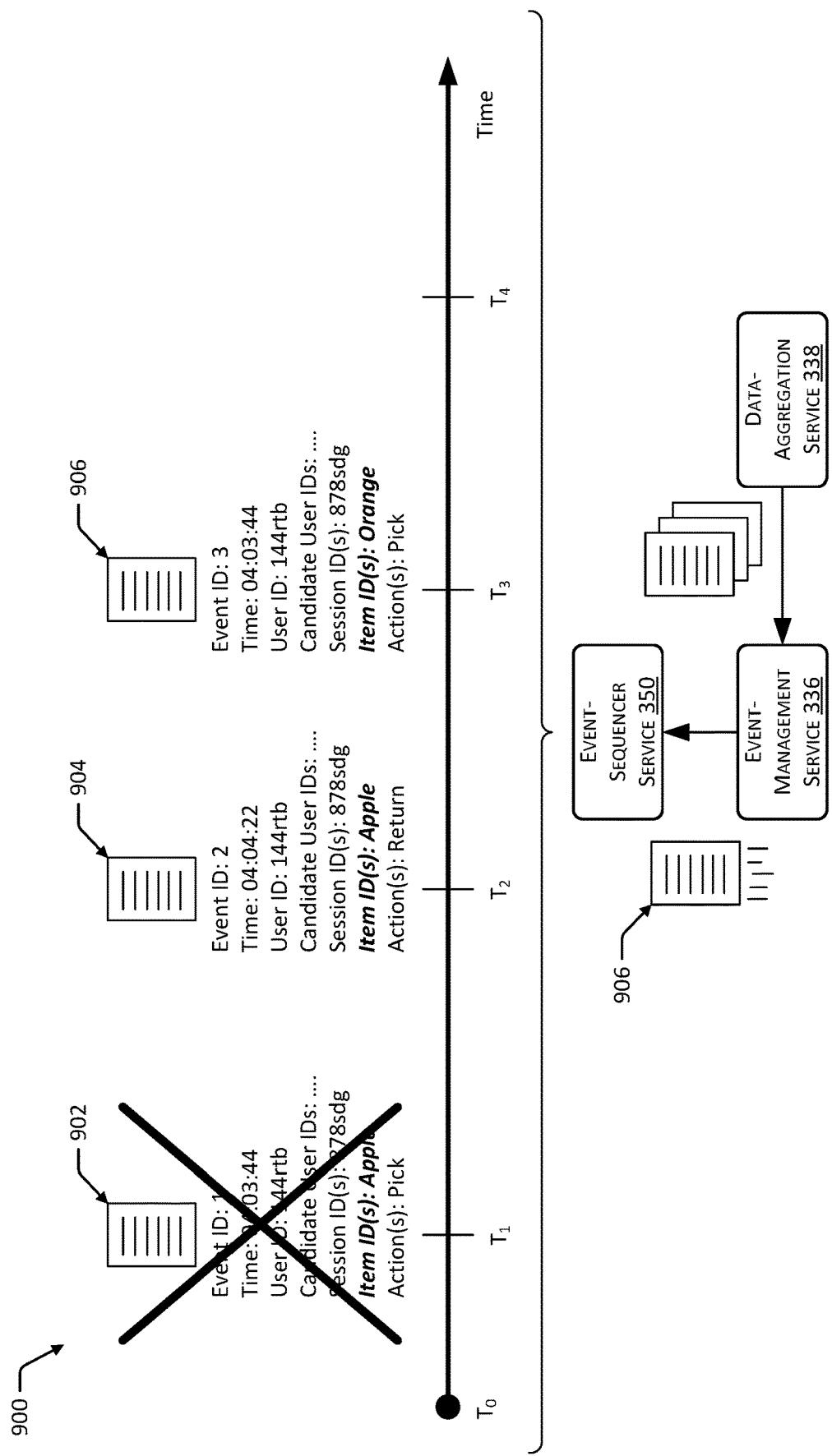

FIG. 9*c*, meanwhile, continues the example and illustrates the event-management service 336 sending a third event record 906 to the event-sequencer service 350 at time $T_3$. As illustrated, this event record 906 is associated with a third event identifier ("3"), the same first time as the first event record 902, the same user identifier, one or more candidate identifiers, the same session identifier, an identifier of an item associated with the event (in this case, an orange), and the action taken with respect to the item. In some instances, this record 906 may be accompanied with a request to cancel the first event record 902. That is, the event record 906 may represent an update result of the first event. Thus, the event record 906 may be effectively replacing the first event record 902. For instance, the result associated with the first event record may have been determined to have a confidence level less than the threshold and, hence, the associate service 352 may have been called to analyze the sensor data associated with the first event to make a determination of a result of the first event. In this example, the event record 906 indicates that the user actually picked an orange rather than the apple as initially determined and illustrated at event record 902. However, because this event record 906 has been processed and recorded after the processing of the event record 904, the second event was processed without the result of the event record 906. For instance, the hypothesis-generator service 346 analyzed the sensor data associated with the second event at a time when a virtual shopping cart of the user contained an apple (when in fact the user had selected an orange). Thus, the second event may be reprocessed given that the second event record corresponding to the second event was processed earlier in time than the updated event 906, and given that the second event relates to the first event via the common user identifier.

Figure 9D:
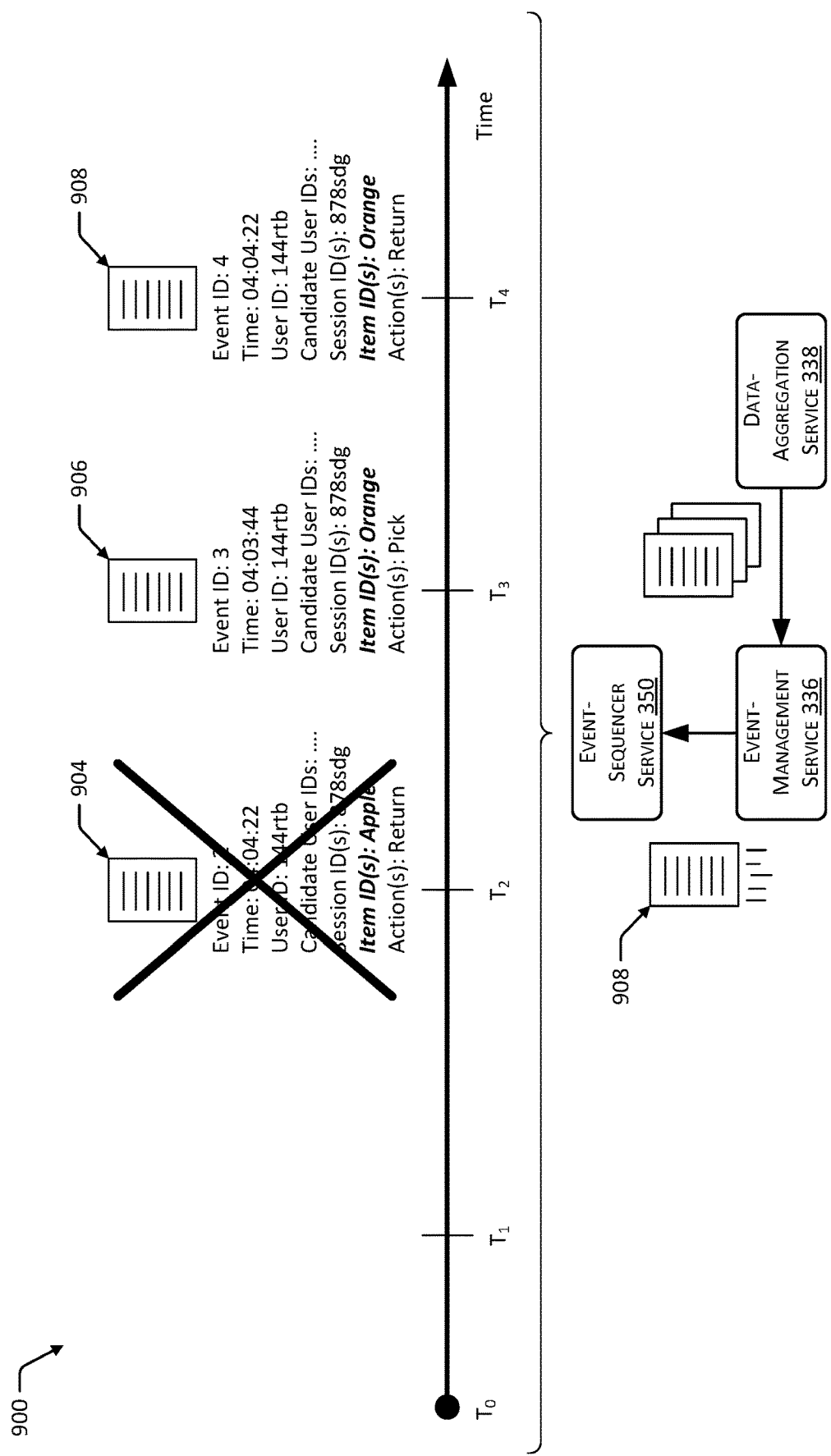

FIG. 9*d*, therefore, illustrates that the second event may be reprocessed. That is, the hypothesis-generator service 346 (or the associate service 352) may reanalyze the sensor data associated with the second event to generate a new event record 908 associated with the second event. In this instance, now that the user's virtual shopping cart is determined to contain an orange rather than an apple at the time of the return of the item, the hypothesis-generator service 346 determines that the user returned an orange rather than an apple to the shelf.

FIG. 9*d* illustrates the event-management service 336 sending the fourth event record 908 to the event-sequencer service 350 at time $T_4$. In addition, the event-management service 336 may send a request to cancel the third event record 904 associated with the second event, having been superseded by the fourth event record 908. Further, after reprocessing of the event, the virtual shopping cart of the user may be updated accordingly.

FIGS. 10*a*-10*d* collectively illustrate another schematic diagram of reprocessing a second event based on the result of an earlier, first event changing. In this example, the user associated with the first event changes from a first user to a second user. Thus, events associated with both users that have respective times later than the first event (e.g., the illustrated second event) are to be reprocessed.

Figure 10A:
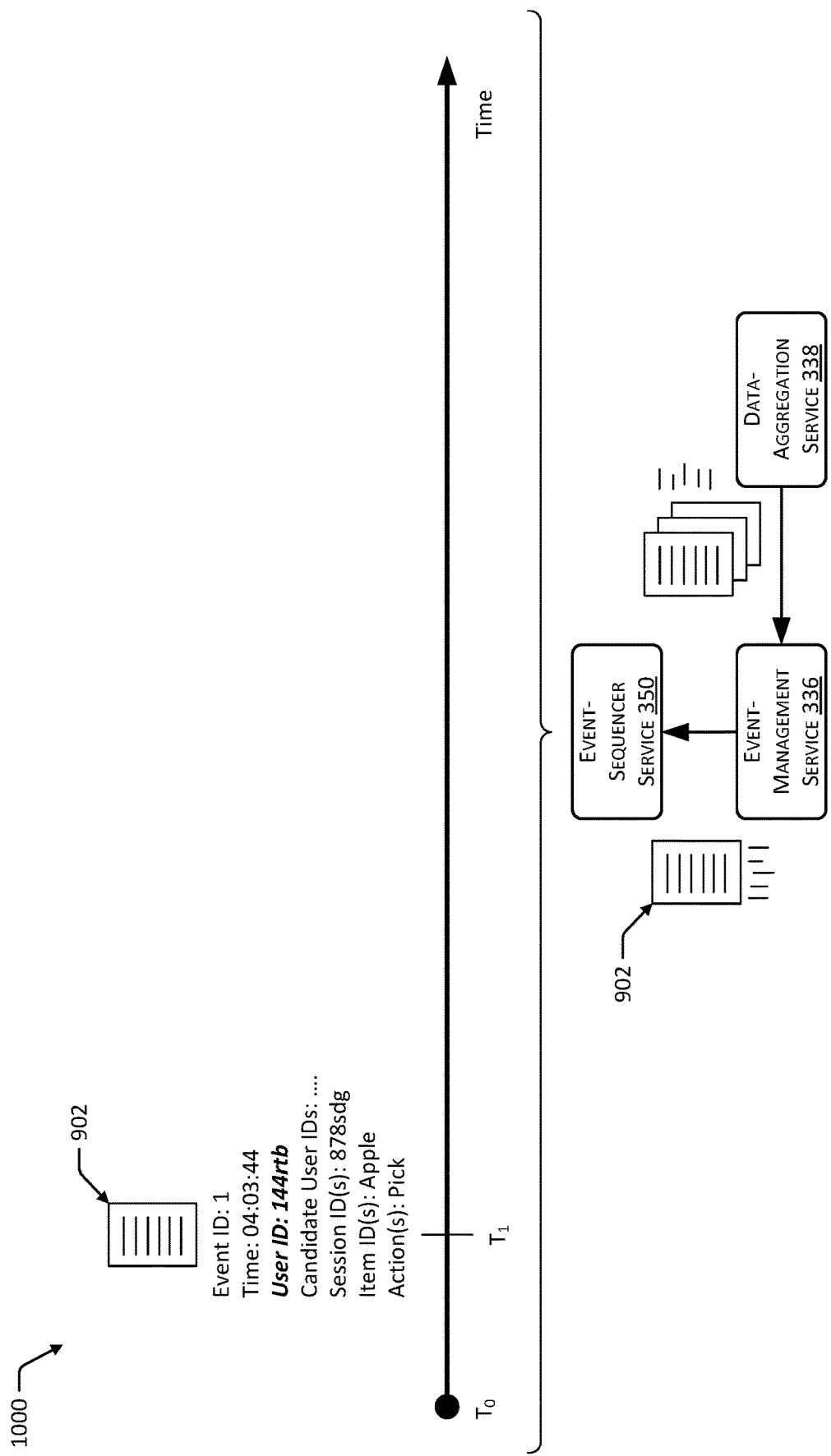
FIGS. 10a-10d collectively illustrate another schematic diagram of reprocessing a second event based on the result of an earlier, first event changing. In this example, the user associated with the first event changes from a first user to a second user. Thus, events associated with both users that have respective times later than the first event (e.g., the illustrated second event) are to be reprocessed.

FIG. 10*a* illustrates that a time, $T_1$, the same example first event record 902 associated with a first event is passed from the event-management service 336 to the event-sequencer service 350. Again, the event record 902 indicates that the inventory management system 316 has determined that the a user identifier ("144*rtb*") associated with a particular user picked an apple from a shelf at time 04:403:44.

Figure 10B:
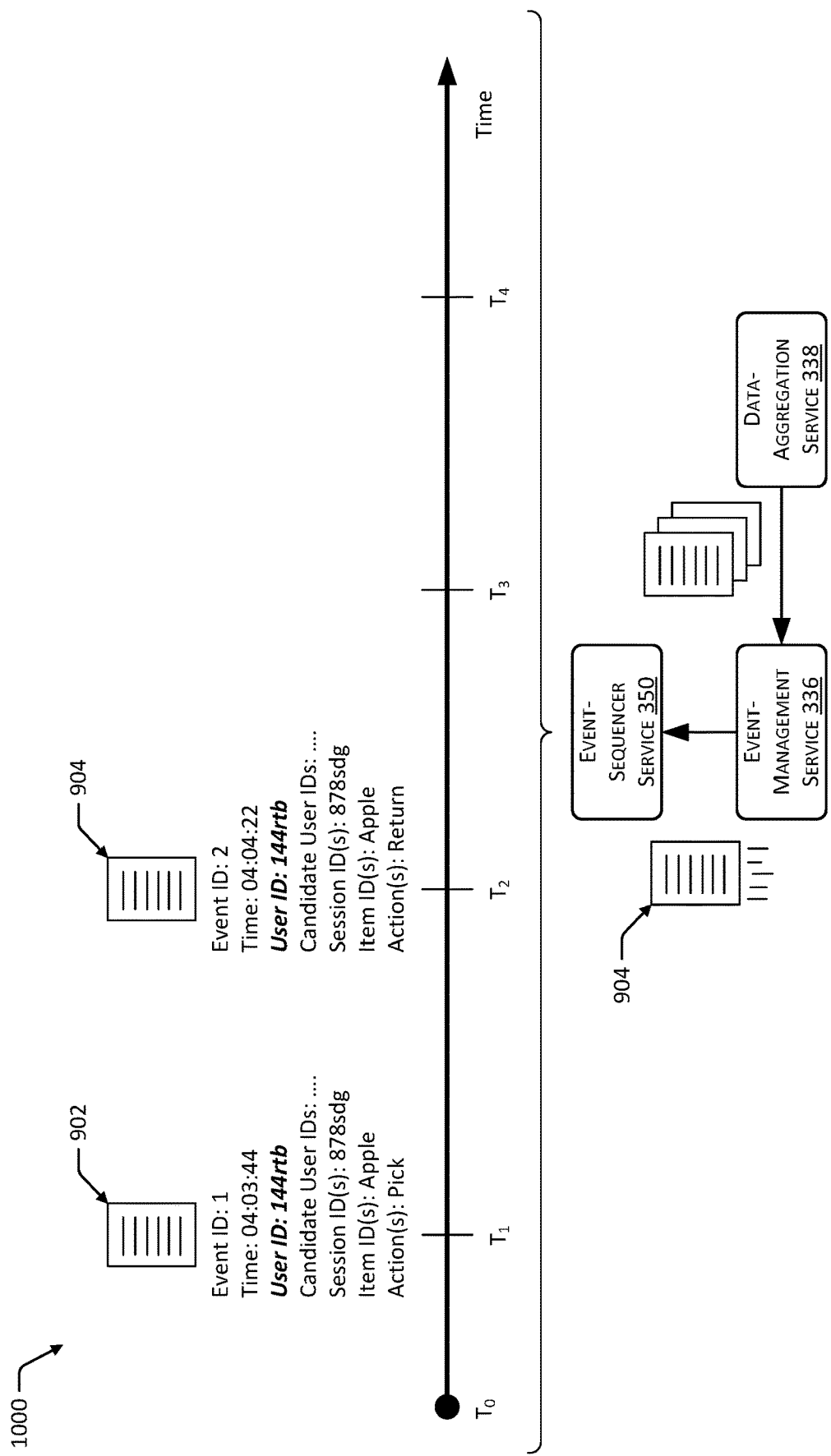

FIG. 10*b* continues the example and illustrates the event-management service 336 sending the same second event record 904 to the event-sequencer service 350 at time $T_2$. Again, the event record 904 is associated with a second event identifier ("2"), a second time that is subsequent to the first time, the same user identifier, one or more candidate identifiers, the same session identifier, an identifier of an item associated with the event (in this case, the apple), and the action taken with respect to the item. In this instance, the example event record 904 indicates that the same user who picked the apple at 04:03:44 returned the apple to the shelf at 04:04:22.

Figure 10C:
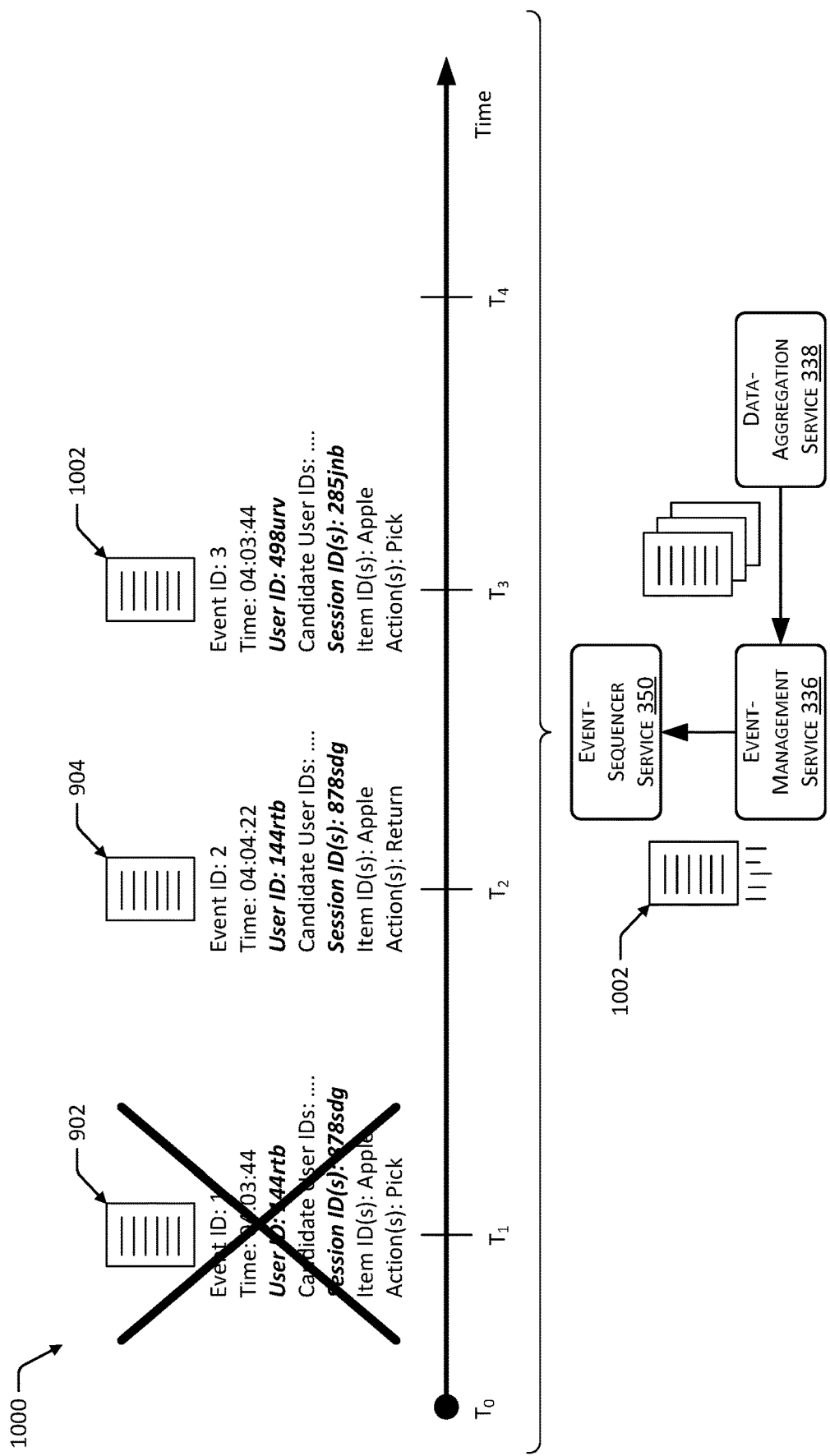

FIG. 10*c*, meanwhile, continues the example and illustrates the event-management service 336 sending a third event record 1002 to the event-sequencer service 350 at time $T_3$. As illustrated, this event record 1002 is associated with a third event identifier ("3"), the same first time as the first event record 902, a different user identifier ("498*urv*"), one or more candidate identifiers, the same session identifier, the same item identifier, and the action taken with respect to the item. In some instances, this record 906 may be accompanied with a request to cancel the first event record 902. That is, the event record 906 may represent an update result of the first event. Thus, the event record 906 may be effectively replacing the first event record 902. For instance, the result associated with the first event record may have been determined to have a confidence level less than the threshold and, hence, the associate service 352 may have been called to analyze the sensor data associated with the first event to make a determination of a result of the first event. In this example, the event record 906 indicates that rather than first indicated user ("144*rtb*") picking the apple, a second, different user ("498*urv*") actually performed this action. However, because this event record 1002 has been processed and recorded after the processing of the event record 904, the second event was processed without the result of the event record 1002. For instance, the hypothesis-generator service 346 analyzed the sensor data associated with the second event at a time when it was believed that the user who picked the apple was the first user, rather than the second. Thus, the second event may be reprocessed given that the second event record corresponding to the second event was processed earlier in time than the updated event 1002, and that the change in the result of the first event affects both the virtual shopping cart of the first user and the second user.

Figure 10D:
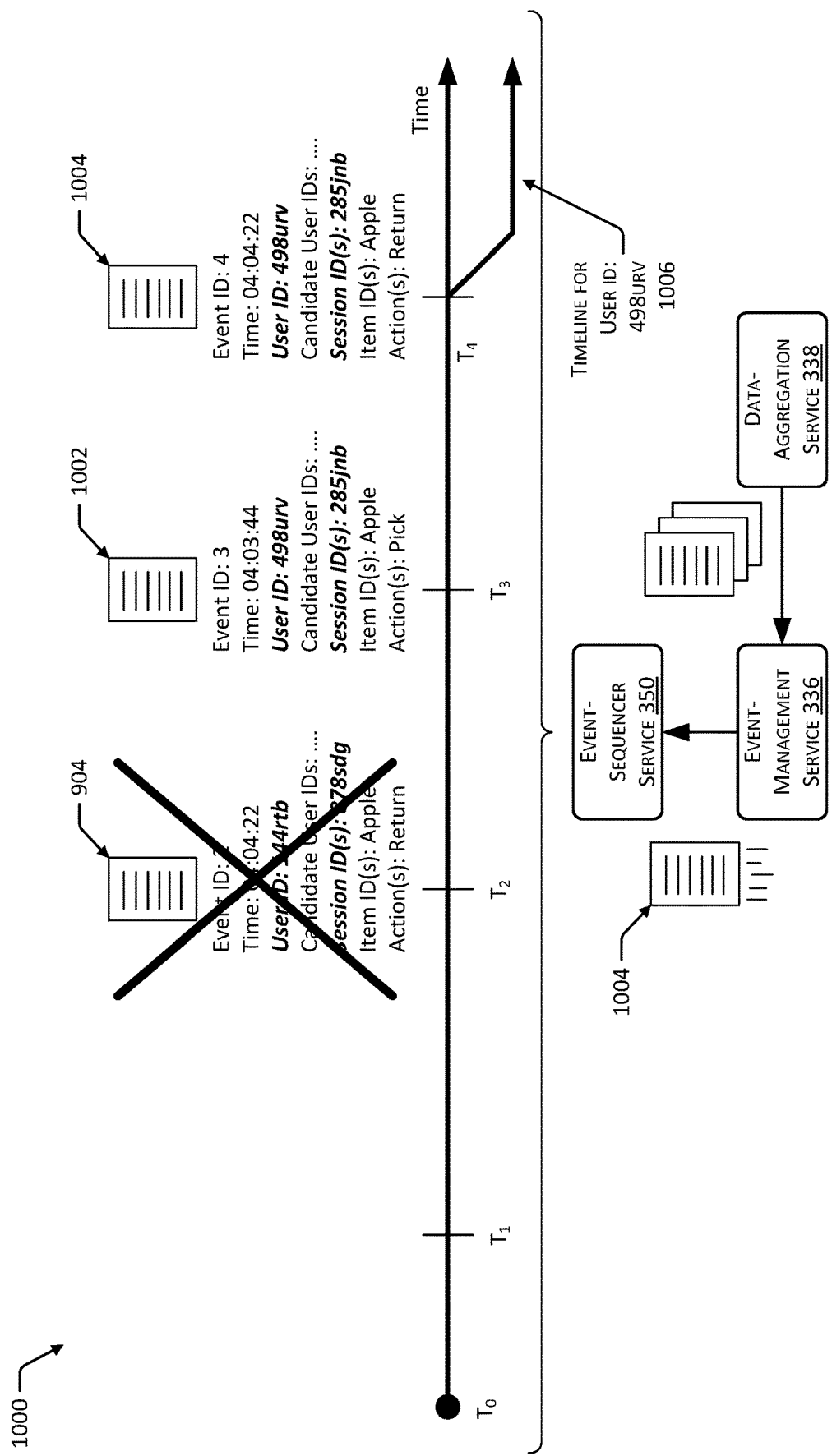

FIG. 10*d*, therefore, illustrates that the second event may be reprocessed. That is, the hypothesis-generator service 346 (or the associate service 352) may reanalyze the sensor data associated with the second event to generate a new event record 1004 associated with the second event. In this instance, now that the second user was determined to be user that picked the apple, the service 346 may determine that it was the second user that also returned the apple shortly thereafter.

FIG. 10*d* illustrates the event-management service 336 sending the fourth event record 1004 to the event-sequencer service 350 at time $T_4$. In addition, the event-management service 336 may send a request to cancel the third event record 904 associated with the second event, having been superseded by the fourth event record 1004. Further, both the first user's virtual shopping cart and the second user's virtual shopping cart may be updated to reflect these updated results. Further, and as illustrated at 1006, the system 316 may continue to reprocess events for both the first user ("144*rtb*") and the second user ("498*urv*"), potentially along with any members of the sessions of these two users.

Figure 11A:
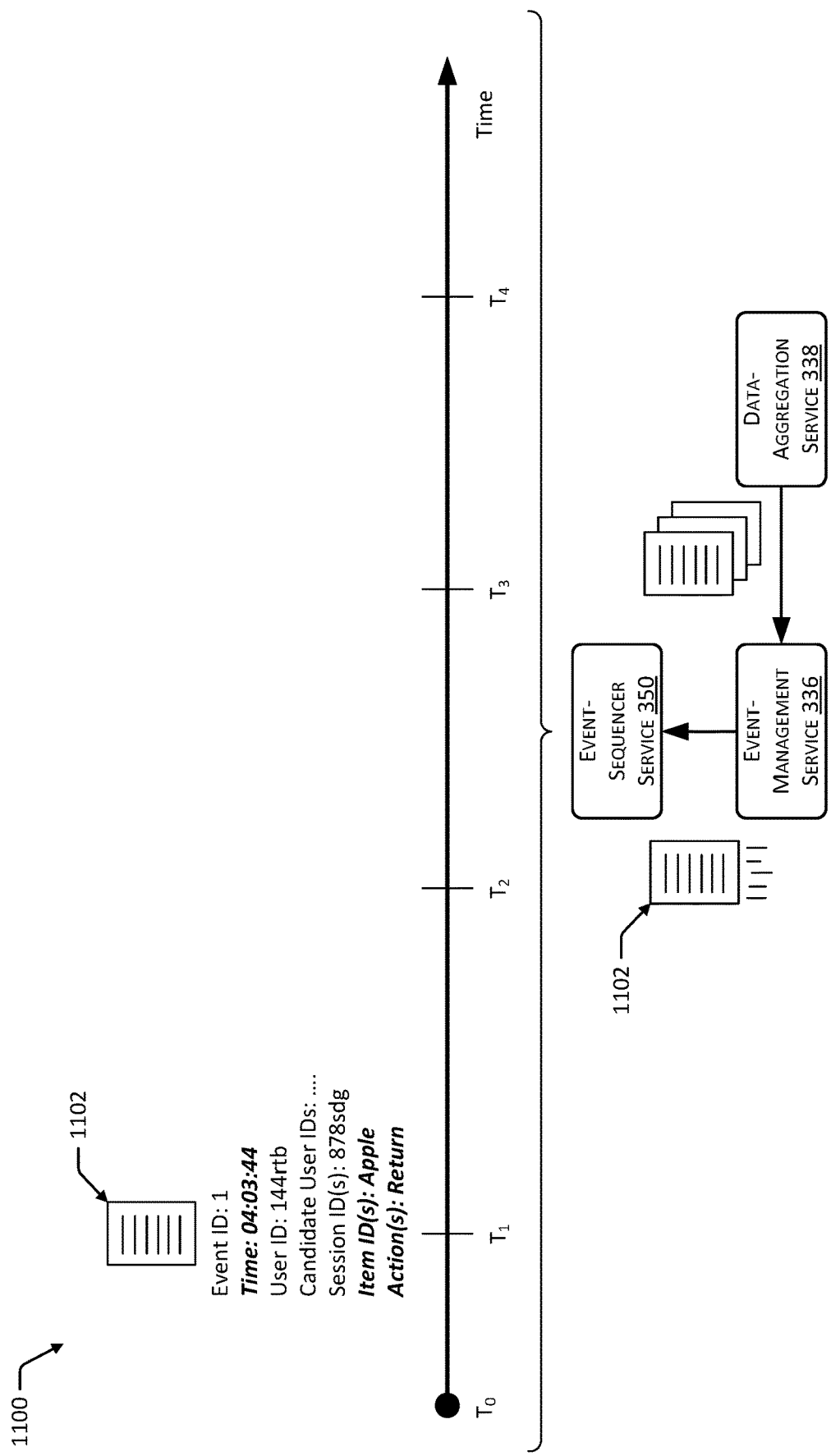
FIGS. 11a-11c collectively illustrate a schematic diagram of reprocessing an event based on the processing of events occurring out-of-order. That is, in the illustrated example, a first event that occurred earlier in time than a second event is processed after the second, later event. Thus, because the second event was processed without the result of the first event, the second event is to be reprocessed with the benefit of the result of the first event.
Figure 11B:
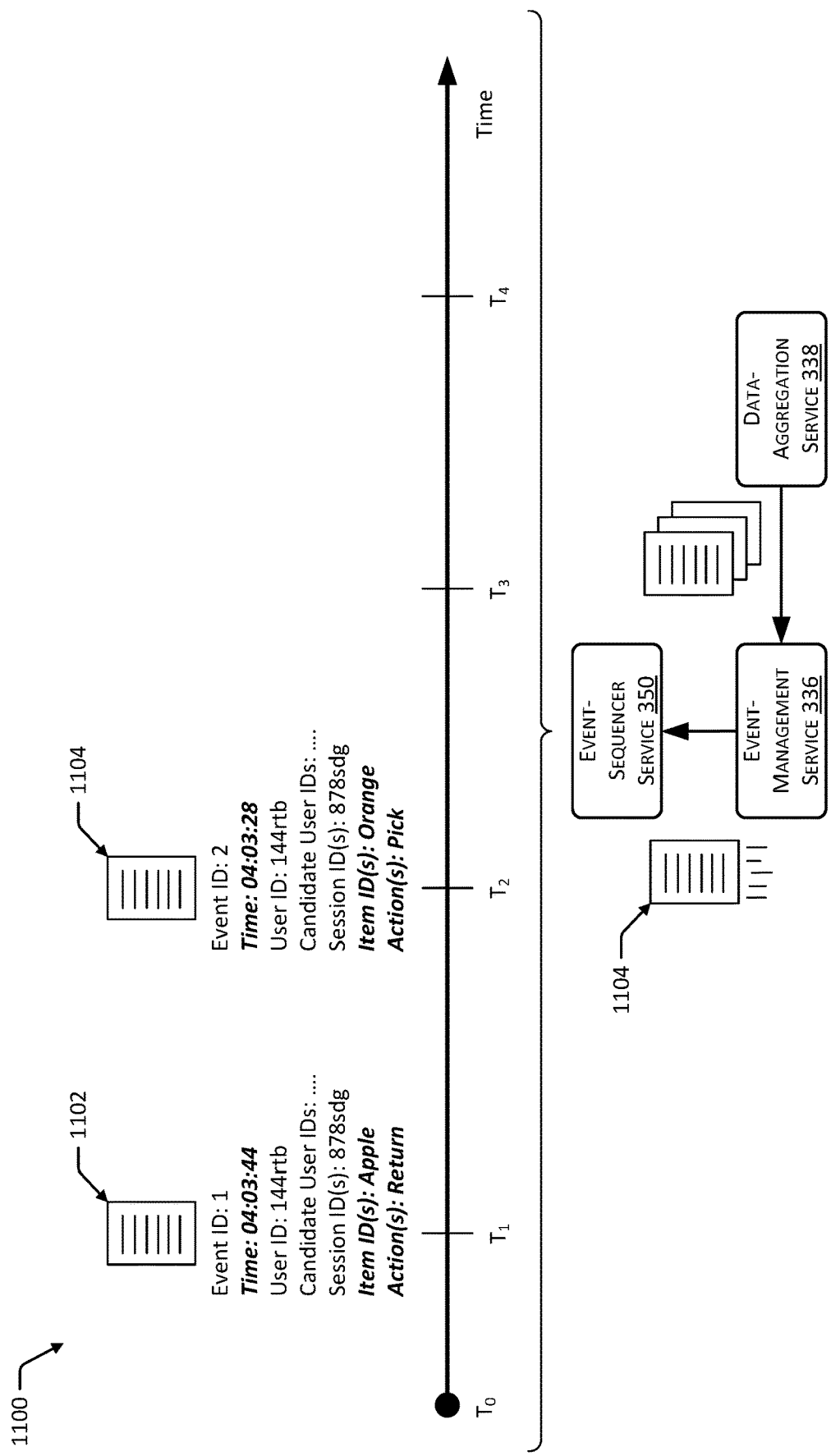
Figure 11C:
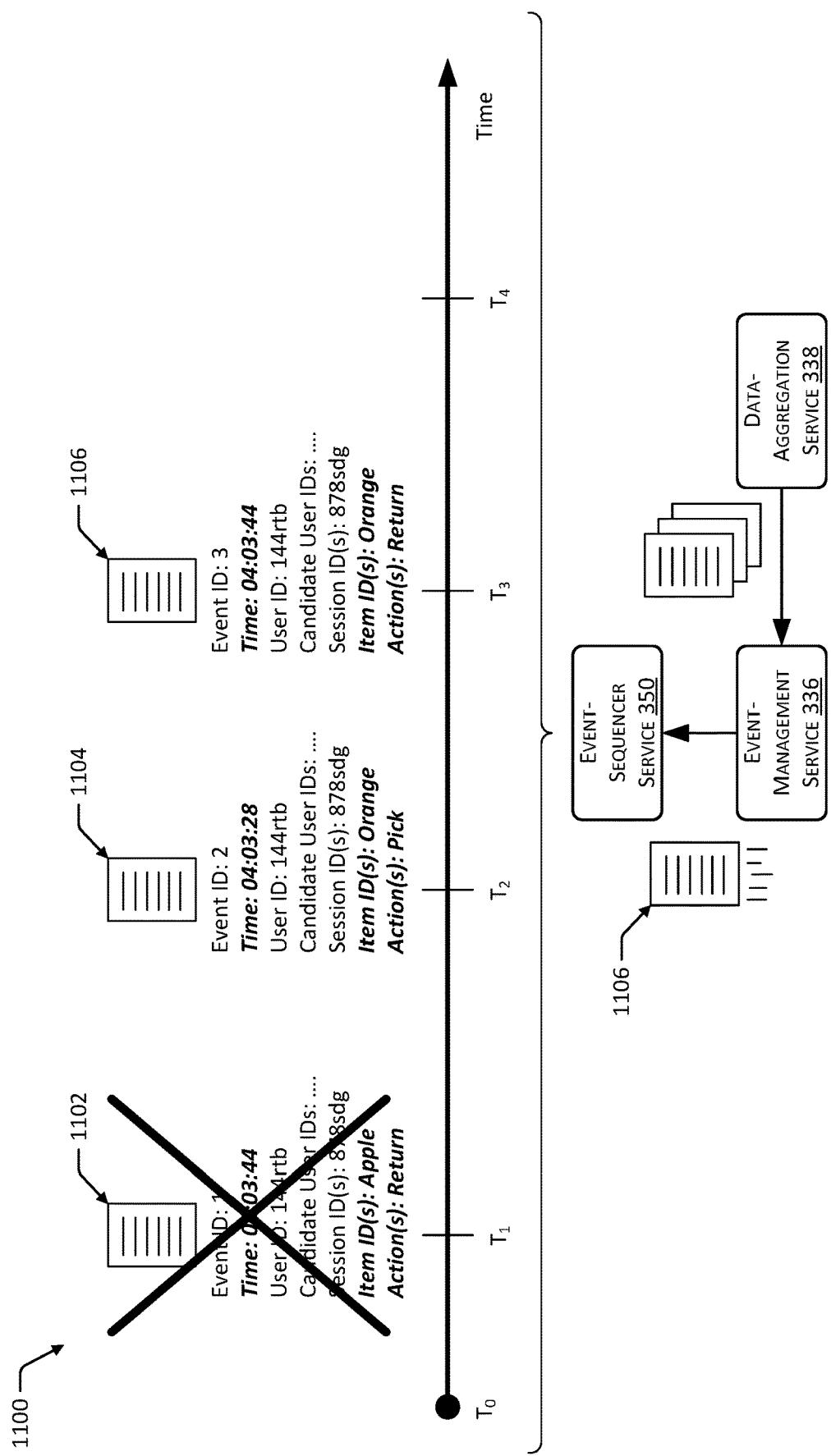

FIGS. 11*a*-11*c* collectively illustrate a schematic diagram of reprocessing an event based on the processing of events occurring out-of-order. That is, in the illustrated example, a first event that occurred earlier in time than a second event is processed after the second, later event. Thus, because the second event was processed without the result of the first event, the second event is to be reprocessed with the benefit of the result of the first event.

FIG. 11*a* illustrates that a time, $T_1$, a first event record 1102 associated with a first event is passed from the event-management service 336 to the event-sequencer service 350. As illustrated, the first event record 1102 indicates that a user returned an apple at time 04:03:44. FIG. 11*b*, meanwhile, illustrates the event-management service 336 sending a second event record 1104 to the event-sequencer service 350 at time $T_2$. As illustrated, however, the second event record 1104 indicates the results of a second event that actually occurred at a time (04:03:28) that preceded the first event associated with the first event record 1102. That is, while the first event record 1102 was processed prior the second event record 1104, the second event actually occurred earlier in time than the first event. The second event record 1104, meanwhile, indicates that the same user that is associated with the first event record 1102 picked an orange at 04:03:28.

In this example, because the first event was processed prior to the second event, the virtual shopping cart of the user had not been updated at the time of the processing of the first event to indicate that the user was holding an orange. As such, the first event record 1102 was generated based on an inaccurate state of the virtual shopping cart of the user.

FIG. 11*c*, therefore, illustrates that the system 316 has reprocessed the first event with the updated information regarding the presence of the orange in the virtual shopping cart of the user. As illustrated the event-management service 336 sends an event record 1106 corresponding to the first event to the event-sequencer service 350. The third event record 1106 indicates that the user in fact returned an orange to the shelf rather than the apple.

It is noted that in this example, because the first and second events were processed only slightly out-of-order, the second event was not processed after the result of the first event was determined. As such, the second event was processed with an accurate state of the virtual shopping cart, and thus, did not need reprocessing. The following example, however, describes an example where events are processed significantly out-of-order.

FIGS. 12*a*-12*d* collectively illustrate another schematic diagram of reprocessing an event based on the processing of events occurring out-of-order. In this illustrated example, a first event that occurred earlier in time than a second event is processed after the second, later event. Thus, because the second event was processed without the result of the first event, the second event is to be reprocessed with the benefit of the result of the first event. Further, in this example the second event is entirely processed prior to the beginning of processing of the first event. Thus, the first event is also to be reprocessed, given that the initial processing of the first event took into account the result of the second event, which in actuality occurred later in time than did the first event.

Figure 12A:
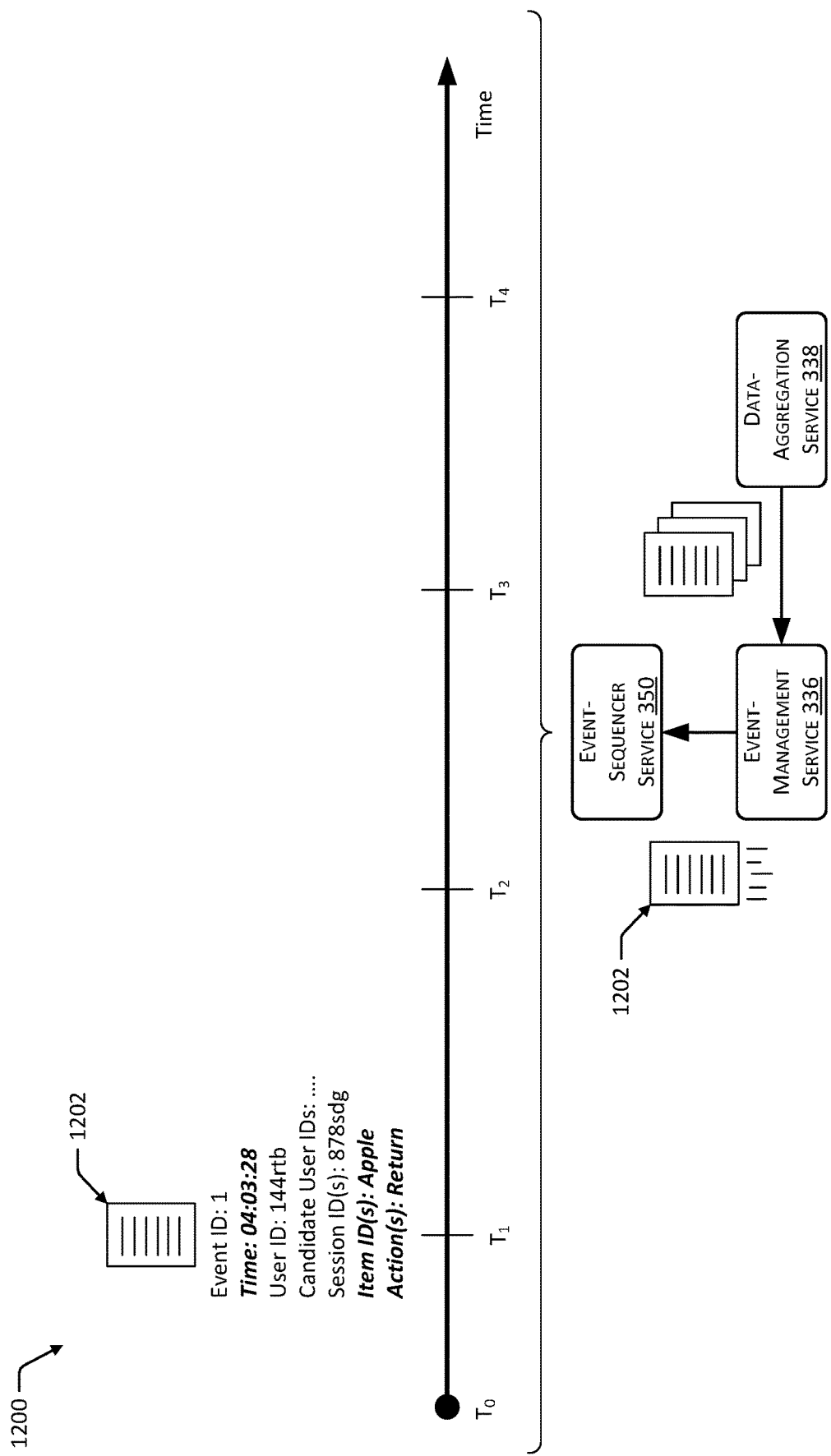

FIG. 12*a* initially illustrates the event-management service 336 sending a first event record 1202 corresponding to a first event to the event-sequencer service 350 at time $T_1$. As illustrated, the event record 1202 indicates that a user returned an apple to a shelf at 04:03:28. FIG. 12*b*, meanwhile, illustrates the event-management service 336 sending a second event record 1204 to the event-sequencer service 350 at time $T_2$. As illustrated, however, the second event record 1204 indicates the results of a second event that actually occurred at a time (03:59:44) that preceded the first event associated with the first event record 1202 by several minutes. That is, while the first event record 1202 was processed prior the second event record 1204, the second event actually occurred earlier in time than the first event. The second event record 1204, meanwhile, indicates that the same user that is associated with the first event record 1202 picked an apple at 03:59:44.

In this example, because the first event was processed prior to the second event, the virtual shopping cart of the user had not been updated at the time of the processing of the first event to indicate that the user was holding an apple. As such, the first event record 1202 was generated based on an inaccurate state of the virtual shopping cart of the user. Further, because in this example the event record 1202 was processed prior to the beginning of the processing of the second event record 1204, the second event was also processed with an inaccurate view of the world. Namely, the second event was processed with the virtual shopping cart of the user including one fewer apple (potentially negative one apples) than in fact the user had in her cart. As such, both the first and second events were processed based on inaccurate system states and, hence, both are to be reprocessed.

Figure 12C:
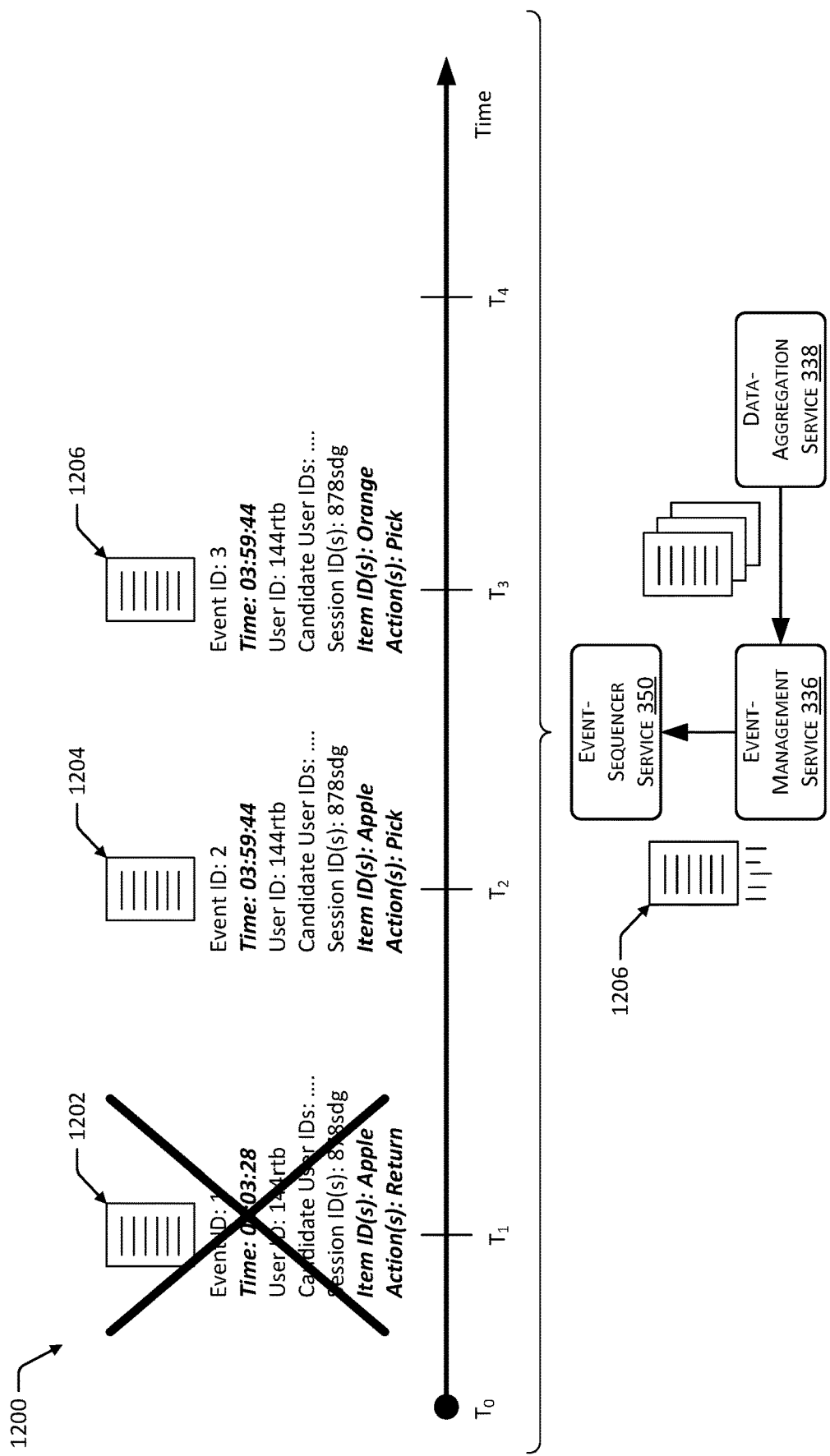

FIG. 12c, therefore, illustrates canceling the first event record 1202 and reprocessing the second event (which was first in time) without the potentially false information of the first event record 1202 being taken into account. As illustrated, at time $T_3$ the event-management service 336 sends a third event record 1206 associated with the second event to the event-sequencer service 350. In this example, the event record 1206 indicates that the user actually picked an orange.

Figure 12D:
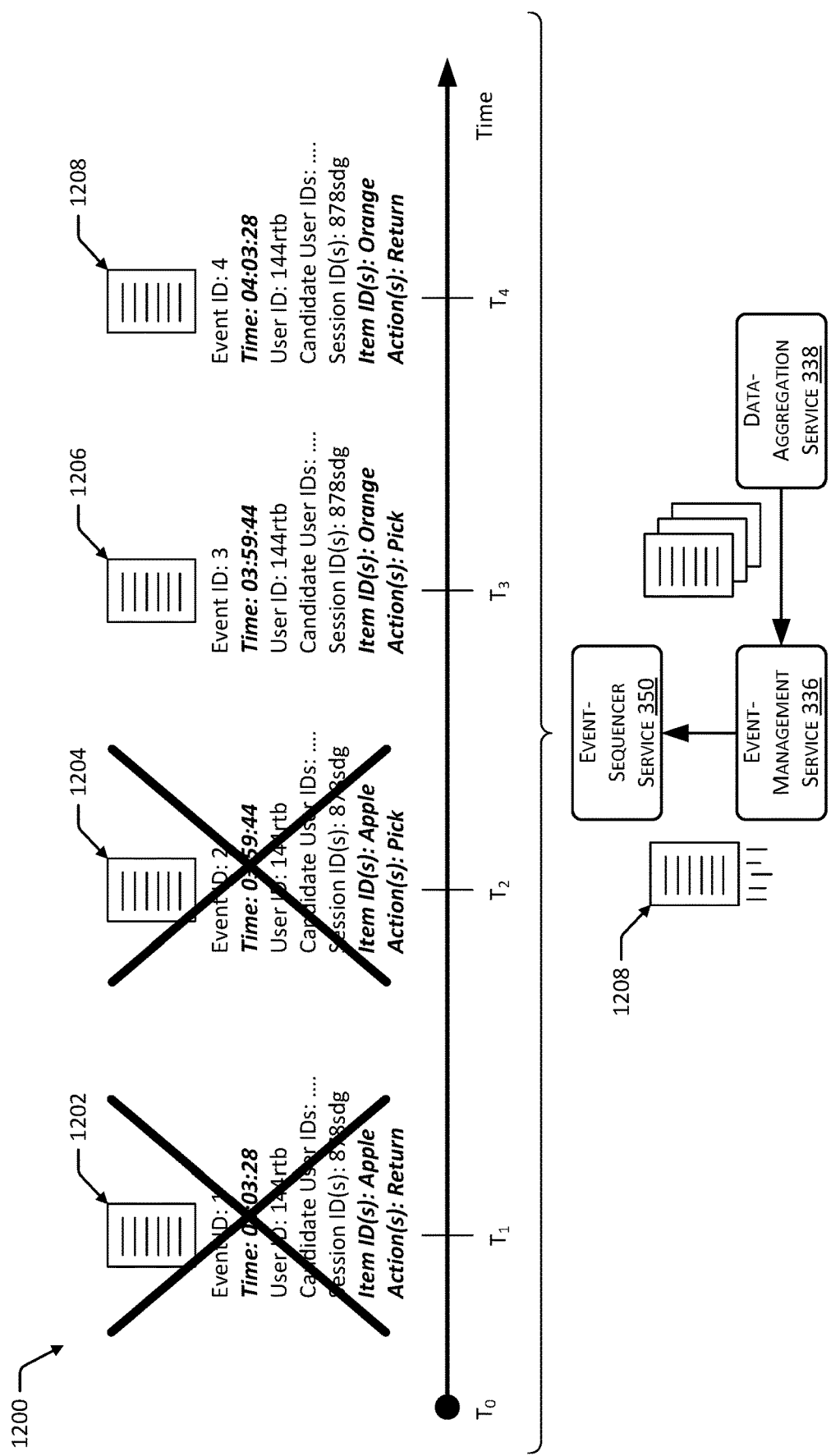

Next, now that the first-in-real-time event has been accurately processed, FIG. 12d illustrates the reprocessing of the first event (second-in-time) without an accurate view of the state of the system. As illustrated, at time $T_4$ the event-management service 336 sends a fourth event record 1208 associated with the first event to the event-sequencer service 350. In this example, the event record 1208 indicates that the user actually returned an orange. The first event record associated with the first event is also canceled.

Figure 13:
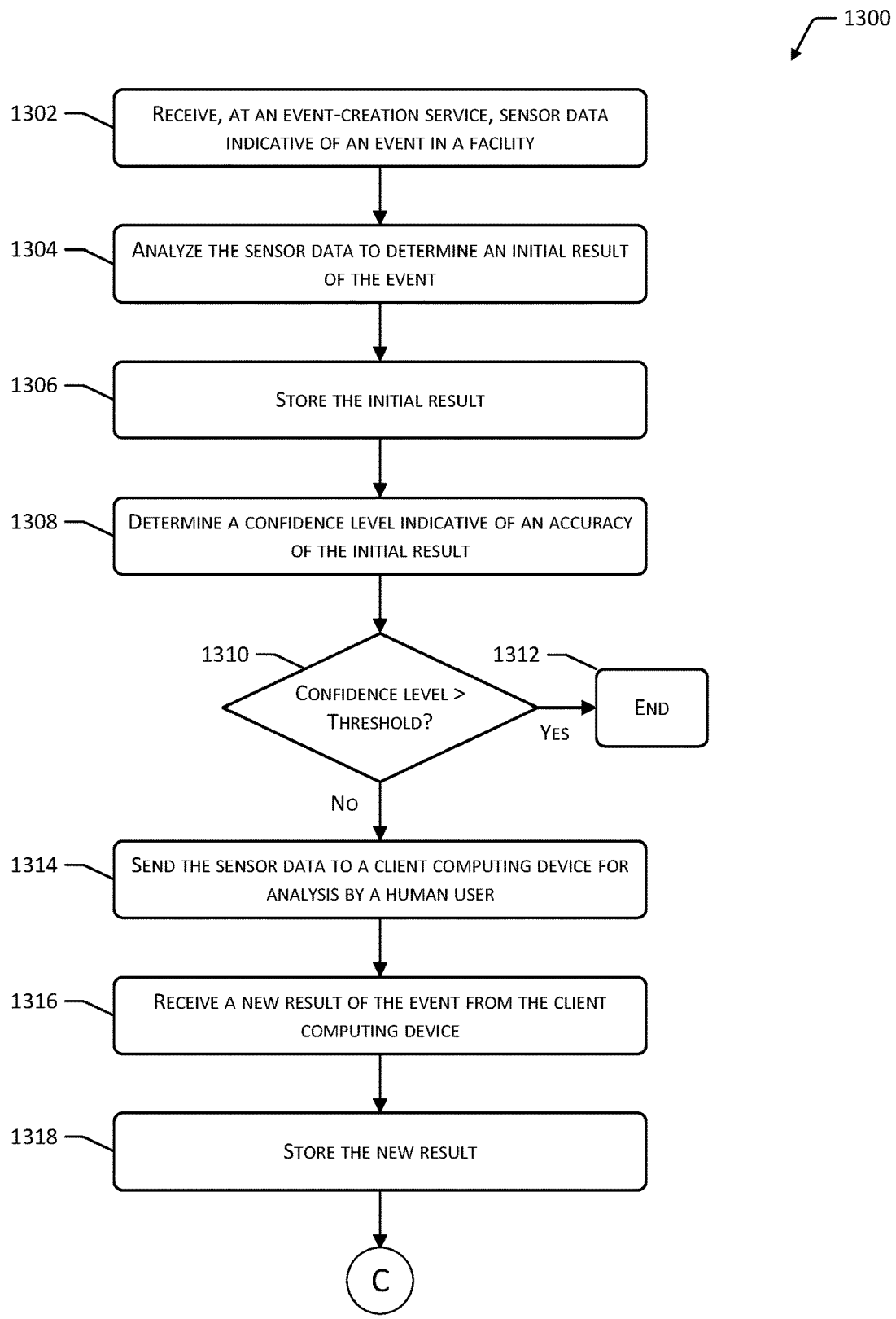
FIGS. 13-14 collectively illustrate a flow diagram of an example process for reprocessing chains of events based on the change in a result of a seed event.
Figure 14:
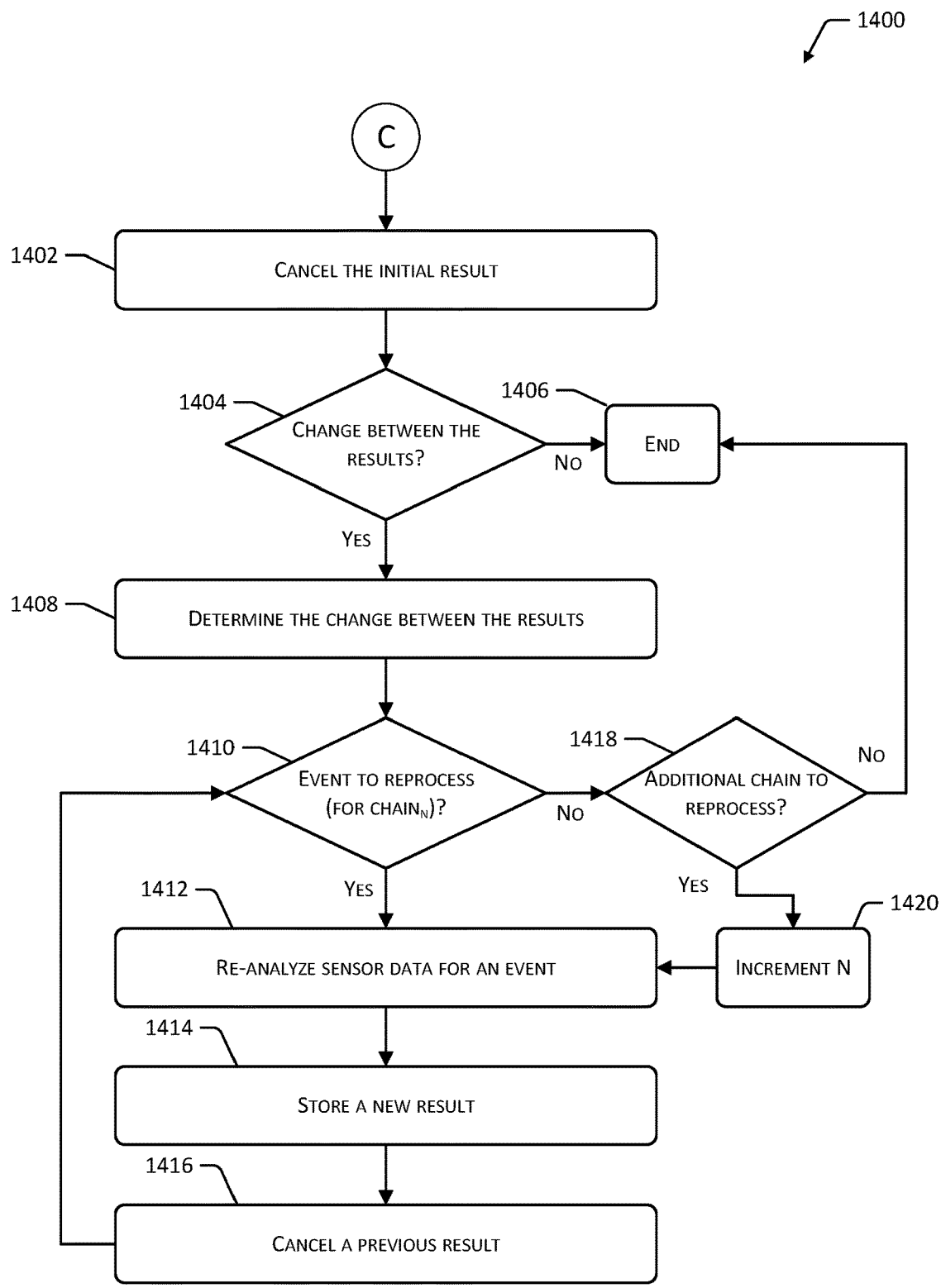

FIGS. 13-14 collectively illustrate a flow diagram of an example process for reprocessing chains of events based on the change in a result of a seed event. In some instances, the process (illustrated via diagrams 1300 and 1400) may be performed by the inventory management system described above. At 1302, the inventory management system receives, at an event-creation service and from one or more sensors residing within a facility, sensor data indicative of an event, the event comprising handling of an item from a shelf of the facility. At 1304, the system analyzes the sensor data to determine an initial result of the event. For instance, the hypothesis-generator service 336 may determine the initial result of the event using the techniques described above. At 1306, the system may store the initial result and, potentially, update virtual-shopping-cart data of a user based on the result.

At 1308, the system may determine a confidence level of the event record indicative of an accuracy of the initial result. Again, the hypothesis-generator service 336 may determine this confidence level in some instances. At 1310, the system determines whether the confidence level is greater than a confidence-level threshold. If so, then at 1312 the process may end. If not, however, then at 1314 the system may send the sensor data (or a location for acquiring the sensor data) to a client computing device for analysis by a human user. At 1316, the system receives a new result of the event from the client computing device based on the analysis of the human user. At 1318, the system stores the new result by, for example, generating a new event record or modifying the initial event record.

FIG. 14 continues the illustration and includes, at 1402, the system canceling the initial result. This may include deleting the entire initial event record or replacing the portion of the initial event record corresponding to the initial result with the new result. At 1404, the process determines whether there is a change between the initial result and the new result. If not (e.g., because the human user confirmed the analysis of the automated determination), then the process ends at 1406. If a change does exist, however, then the system determines the change at 1408. At 1410, the system determines whether there is an event to reprocess for a first chain (chain$_n$) based on the changed result. For instance, if the new result changed an item taken by a particular user, the system may determine whether any results have been processed for that user for events that took place subsequent to the subject event (i.e., the seed event). Or, if the new result changed the identifier user, then the process may determine for the first user whether any events are to be reprocessed and, eventually, whether any events of the second user are to be reprocessed.

If there is an event to reprocess based on the changed result, then at 1410 the system reanalyzes sensor data for a particular event to-be-reprocessed. At 1412, the system stores a new result of the reprocessed event and, at 1414, cancels a previous result of that event. This may include generating a new event record and canceling a previous event record associated with the event. The process then loops back to 1410 to determine whether another event is to be reprocessed for this particular chain until all events for that chain have been reprocessed up to the current time.

Thereafter, the system determines at 1418, whether there is an additional chain to reprocess. For instance, in the example where the result of the seed event changed from a first user to a second user, the process may reprocess a chain of events for the first as well as the second user. Further, the system may reprocess events for users associated with a common session identifier as the first user or the second user. In any event, if another chain is to be reprocessed, then at 1420 the system increments "n" and reprocesses the events for the next chain until all events and all chains have been reprocessed. At that point, the reprocessing ends at 1406.

If no events are to be reprocessed based for the first chain (e.g., corresponding to a particular user), then the process determines at 1

Figure 15:
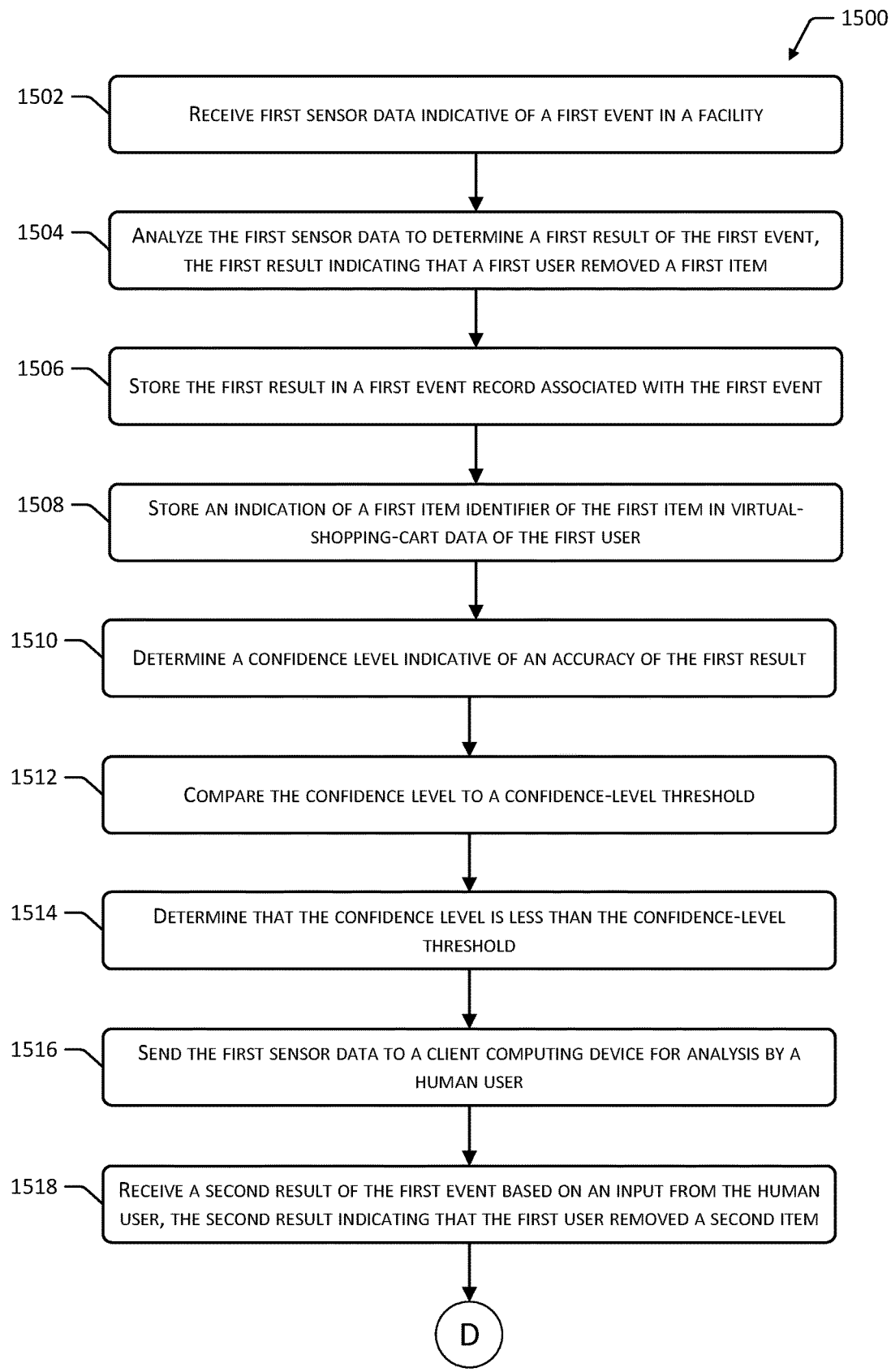
FIGS. 15-17 collectively illustrate a flow diagram of another example process for reprocessing chains of events based on the change in a result of a seed event.
Figure 16:
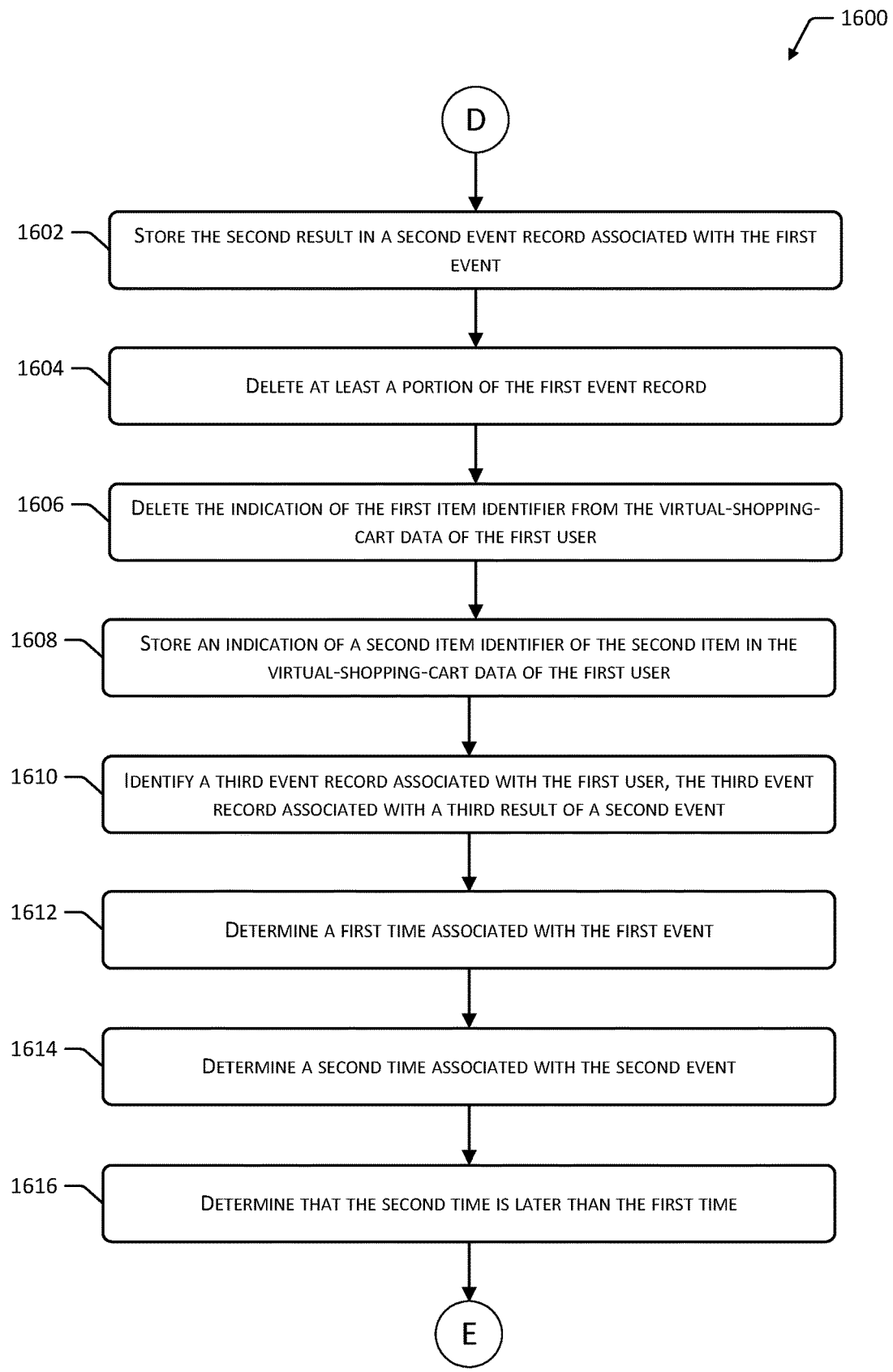
Figure 17:
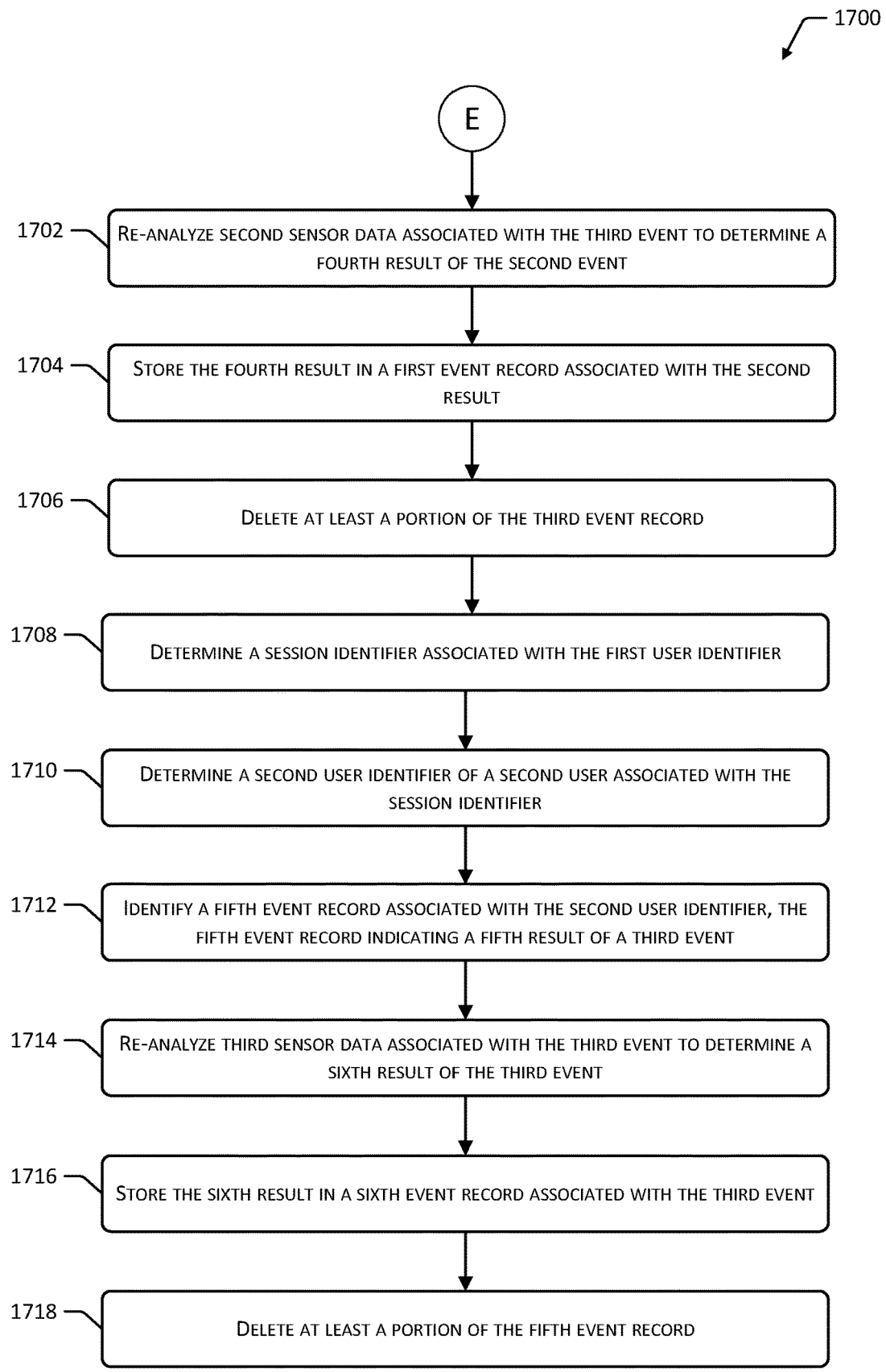

FIGS. 15-17 collectively illustrate a flow diagram of another example process for reprocessing chains of events based on the change in a result of a seed event. In some instances, the process (illustrated via diagrams 1500, 1600, and 1700) may be performed by the inventory management system described above. At 1502, the system receives first sensor data indicative of a first event that occurred within a facility. At 1504, the system analyzes the first sensor data to determine a first result of the first event, the first result indicating that a first user associated with a first user identifier removed a first item from a shelf of the facility. At 1506, the system stores the first result in a first event record associated with the first event and, at 1508, stores an indication of a first item identifier of the first item in virtual-shopping-cart data associated with the first user identifier.

At 1510, the system determines a confidence level indicative of an accuracy of the first result and, at 1512, compares the confidence level to a confidence-level threshold. At 1514, in this example the system determines that the confidence level is less than the confidence-level threshold. Based on this result, at 1516 the system sends the first sensor data to a client computing device for analysis by a human user. At 1518, the system receives, from the client computing device and based on an input from the human user, a second result of the first event, the second result indicating that the first user removed a second item from the shelf of the facility.

FIG. 16 continues the illustration of the process and includes, at 1602, storing the second result in a second event record associated with the first event. At 1604, the system deletes at least a portion of the first event record and, at 1606, deletes the indication of the first item identifier from the virtual-shopping-cart data associated with the first user identifier. At 1608, meanwhile, the system stores an indication of a second item identifier associated with the second item in the virtual-shopping-cart data associated with the first user identifier. At 1610, the system identifies a third event record associated with the first user identifier, the third event record indicating a third result of a second event, the third event record associated with second sensor data. At 1612 and 1614, the system respectively determines (e.g., from metadata associated with the sensor data) a first time associated with the first event and a second time associated with the second event. At 1616, the system determines that the second time is later than the first time.

FIG. 17 continues the illustration of the process and includes, at 1702, re-analyzing the second sensor data to determine a fourth result of the second event. At 1704, the system then stores the fourth result in a fourth event record associated with the second event and, at 1706, deletes at least a portion of the third event record. At 1708, meanwhile, the system determines a session identifier associated with the first user identifier and, at 1710, determines a second user identifier of a second user that is associated with the session identifier. Thereafter, at 1712 the system identifies a fifth event record associated with the second user identifier, the fifth event record indicating a fifth result of a third event, the fifth event record associated with third sensor data and, at 1714, re-analyzes the third sensor data to determine a sixth result of the third event. At 1716 the system stores the sixth result in a sixth event record associated with the third event and, at 1718, deletes at least a portion of the fifth event record.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
storing a first result in association with a first event based at least in part on first sensor data;
generating, using one or more sensors, second sensor data;
analyzing the second sensor data to determine a second result of a second event;
determining a confidence level indicative of an accuracy of the first result;
comparing the confidence level to a confidence-level threshold;
determining that the confidence level is less than the confidence-level threshold;
receiving, based at least in part on reanalysis of at least the first sensor data and at least partly in response to the confidence level being less than the confidence-level threshold, a third result of the first event, the third result differing from the first result;
storing the third result in association with the first event;
analyzing again, by one or more processors and based in part on receiving the third result, the second sensor data using at least the third result to determine a fourth result of the second event; and
storing the fourth result in association with the second event, the second event comprising a user picking an item from an inventory location or returning the item to the inventory location.

2. The method as recited in claim 1, further comprising:
receiving the first sensor data from one or more sensors in a facility;
analyzing the first sensor data to determine the first result; and
wherein the analyzing the second sensor data comprises analyzing the second sensor data using at least the first result to determine the second result.

3. The method as recited in claim 1, further comprising:
determining, at least partly after receiving the third result of the first event, that the first event is associated with a first time that is prior to a second time associated with the second event; and
wherein the analyzing again comprises analyzing again the second sensor data using at least the third result to determine the fourth result of the second event at least partly in response to determining that the first event is associated with the first time that is prior to the second time associated with the second event.

4. The method as recited in claim 1, further comprising:
determining, at least partly after receiving the third result of the first event, that the first event and the second event are associated with a common user; and
wherein the analyzing again comprises analyzing again the second sensor data using at least the third result to determine the fourth result of the second event at least partly in response to determining that the first and the second event are associated with the common user.

5. The method as recited in claim 1, wherein:
the storing the first result comprises storing a first indication of a first action taken with respect to a first item identifier of a first item;
the method further comprises storing a second indication of a second action taken with respect to the first item identifier of the first item;
the storing the third result comprises storing a third indication of the first action taken with respective a second item identifier of a second item; and
the storing the fourth result comprises storing a fourth indication of the second action taken with respect to the second item identifier of the second item.

6. The method as recited in claim 1, wherein:
the storing the first result comprises storing a first indication that the first event was performed by a first user associated with a first user identifier;
the method further comprises storing a second indication that the second event was performed by the first user associated with the first user identifier;
the storing the third result comprises storing a third indication that the first event was performed by a second user associated with a second user identifier; and
the storing the fourth result comprises storing a fourth indication that that the second event was performed by the second user associated with the second user identifier.

7. The method as recited in claim 1, further comprising:
deleting the first result at least partly in response to receiving the third result; and
deleting the second result at least partly in response to analyzing the second sensor data using at least the third result to determine the fourth result.

8. A system comprising:
one or more sensors;
one or more processors; and
one or more computer-readable media storing computer-executable instructions that, when executed, cause the one or more processors to perform acts comprising:
storing a first result in association with a first event based at least in part on first sensor data;
causing the one or more sensors to generate second sensor data;
analyzing the second sensor data to determine a second result of a second event;
determining a confidence level indicative of an accuracy of the first result;
comparing the confidence level to a confidence-level threshold;
determining that the confidence level is less than the confidence-level threshold;
receiving, based at least in part on reanalysis of at least the first sensor data and at least partly in response to the confidence level being less than the confidence-level threshold, a third result of the first event, the third result differing from the first result;
storing the third result]in association with the first event;
analyzing again, by one or more processors and based in part on receiving the third result, the second sensor data using at least the third result to determine a fourth result of the second event; and
storing the fourth result in association with the second event, the second event comprising a user picking an item from an inventory location or returning the item to the inventory location.

9. The system as recited in claim 8, wherein the one or more computer-readable media further store computer-executable instructions that, when executed, cause the one or more processors to perform acts comprising:
receiving the first sensor data from one or more sensors in a facility;
analyzing the first sensor data to determine the first result; and
wherein the analyzing the second sensor data comprises analyzing the second sensor data using at least the first result to determine the second result.

10. The system as recited in claim 8, wherein the one or more computer-readable media further store computer-executable instructions that, when executed, cause the one or more processors to perform acts comprising:
determining, at least partly after receiving the third result of the first event, that the first event is associated with a first time that is prior to a second time associated with the second event; and
wherein the analyzing again comprises analyzing again the second sensor data using at least the third result to determine the fourth result of the second event at least partly in response to determining that the first event is associated with the first time that is prior to the second time associated with the second event.

11. The system as recited in claim 8, wherein the one or more computer-readable media further store computer-executable instructions that, when executed, cause the one or more processors to perform acts comprising:
determining, at least partly after receiving the third result of the first event, that the first event and the second event are associated with a common user; and
wherein the analyzing again comprises analyzing again the second sensor data using at least the third result to determine the fourth result of the second event at least partly in response to determining that the first and the second event are associated with the common user.

12. The system as recited in claim 8, wherein:
the storing the first result comprises storing a first indication of a first action taken with respect to a first item identifier of a first item;
the acts further comprise storing a second indication of a second action taken with respect to the first item identifier of the first item;
the storing the third result comprises storing a third indication of the first action taken with respective a second item identifier of a second item; and
the storing the fourth result comprises storing a fourth indication of the second action taken with respect to the second item identifier of the second item.

13. The system as recited in claim 8, wherein:
the storing the first result comprises storing a first indication that the first event was performed by a first user associated with a first user identifier;
the acts further comprise storing a second indication that the second event was performed by the first user associated with the first user identifier;

the storing the third result comprises storing a third indication that the first event was performed by a second user associated with a second user identifier; and the storing the fourth result comprises storing a fourth indication that that the second event was performed by the second user associated with the second user identifier.

14. The system as recited in claim 8, wherein the one or more computer-readable media further store computer-executable instructions that, when executed, cause the one or more processors to perform acts comprising:

deleting the first result at least partly in response to receiving the third result; and deleting the second result at least partly in response to analyzing the second sensor data using at least the third result to determine the fourth result.

15. One or more non-transitory computer-readable media storing computer-executable instructions that, when executed, cause one or more processors to perform acts comprising:

storing a first result in association with a first event based at least in part on first sensor data;

generating, using one or more sensors, second sensor data;

analyzing the second sensor data to determine a second result of a second event;

determining a confidence level indicative of an accuracy of the first result;

comparing the confidence level to a confidence-level threshold;

determining that the confidence level is less than the confidence-level threshold;

receiving, based at least in part on reanalysis of at least the first sensor data and at least partly in response to the confidence level being less than the confidence-level threshold, a third result of the first event, the third result differing from the first result;

storing the third result in association with the first event;

analyzing again, based in part on receiving the third result, the second sensor data using at least the third result to determine a fourth result of the second event; and storing the fourth result in association with the second event, the second event comprising a user picking an item from an inventory location or returning the item to the inventory location.

16. The one or more non-transitory computer-readable media as recited in claim 15, further storing computer-executable instructions that, when executed, cause the one or more processors to perform acts comprising:

determining, at least partly after receiving the third result of the first event, that the first event is associated with a first time that is prior to a second time associated with the second event; and wherein the analyzing again comprises analyzing again the second sensor data using at least the third result to determine the fourth result of the second event at least partly in response to determining that the first event is associated with the first time that is prior to the second time associated with the second event.

17. The one or more non-transitory computer-readable media as recited in claim 15, further storing computer-executable instructions that, when executed, cause the one or more processors to perform acts comprising:

determining, at least partly after receiving the third result of the first event, that the first event and the second event are associated with a common user; and wherein the analyzing again comprises analyzing again the second sensor data using at least the third result to determine the fourth result of the second event at least partly in response to determining that the first and the second event are associated with the common user.

18. The one or more non-transitory computer-readable media as recited in claim 15, wherein:

the storing the first result comprises storing a first indication of a first action taken with respect to a first item identifier of a first item;

the acts further comprise storing a second indication of a second action taken with respect to the first item identifier of the first item;

the storing the third result comprises storing a third indication of the first action taken with respective a second item identifier of the first item; and the storing the fourth result comprises storing a fourth indication of the second action taken with respect to the second item identifier of the second item.

19. The one or more non-transitory computer-readable media as recited in claim 15, wherein the storing the first result comprises storing a first indication that the first event was performed by a first user associated with a first user identifier;

the acts further comprise storing a second indication that the second event was performed by the first user associated with the first user identifier;

the storing the third result comprises storing a third indication that the first event was performed by a second user associated with a second user identifier; and the storing the fourth result comprises storing a fourth indication that that the second event was performed by the second user associated with the second user identifier.

20. The one or more non-transitory computer-readable media as recited in claim 15, the acts further comprising:

deleting the first result at least partly in response to receiving the third result; and deleting the second result at least partly in response to analyzing the second sensor data using at least the third result to determine the fourth result.

\* \* \* \* \*